(12) United States Patent
Laselva et al.

(10) Patent No.: US 12,395,221 B2
(45) Date of Patent: Aug. 19, 2025

(54) MEASUREMENT ADJUSTMENT IN LOW MOBILITY

(71) Applicant: NOKIA TECHNOLOGIES OY, Espoo (FI)

(72) Inventors: Daniela Laselva, Klarup (DK); Jorma Johannes Kaikkonen, Oulu (FI); Sami-Jukka Hakola, Kempele (FI); Frank Frederiksen, Klarup (DK); Frederick Vook, Schaumburg, IL (US)

(73) Assignee: Nokia Technologies Oy, Espoo (FI)

( * ) Notice: Subject to any disclaimer, the term of this patent is extended or adjusted under 35 U.S.C. 154(b) by 275 days.

(21) Appl. No.: 17/454,038

(22) Filed: Nov. 8, 2021

(65) Prior Publication Data

US 2022/0150726 A1    May 12, 2022

(30) Foreign Application Priority Data

Nov. 9, 2020  (FI) .................................. 20206131

(51) Int. Cl.
*H04W 24/02*  (2009.01)
(52) U.S. Cl.
CPC .................................. *H04W 24/02* (2013.01)
(58) Field of Classification Search
CPC .................................................. H04W 24/02
USPC ....................................................... 370/252
See application file for complete search history.

(56) References Cited

U.S. PATENT DOCUMENTS

| | | | |
|---|---|---|---|
| 10,862,570 B1 * | 12/2020 | Cheraghi | H04B 7/0862 |
| 2020/0022040 A1 | 1/2020 | Chen et al. | |
| 2020/0314868 A1 | 10/2020 | Tseng et al. | |
| 2021/0076275 A1 * | 3/2021 | Yiu | H04W 36/0088 |
| 2021/0175608 A1 * | 6/2021 | Ramasamy | H01Q 1/2266 |

FOREIGN PATENT DOCUMENTS

| | | |
|---|---|---|
| CN | 101449535 A | 6/2009 |
| CN | 109804669 A | 5/2019 |
| CN | 111757346 A | 10/2020 |
| CN | 111800800 A | 10/2020 |
| CN | 109219931 B | 2/2022 |
| WO | 2018128351 A1 | 7/2018 |
| WO | 2020089513 A1 | 5/2020 |
| WO | 2020164903 A1 | 8/2020 |

OTHER PUBLICATIONS

Office Action and Search Report for Finnish Patent Application No. 20206131, dated Feb. 5, 2021, 7 pages.

(Continued)

*Primary Examiner* — Gbemileke J Onamuti
(74) *Attorney, Agent, or Firm* — Brake Hughes Bellermann LLP

(57) ABSTRACT

There is provided an apparatus, a method and a computer program product. In accordance with an embodiment the method comprises obtaining one or more measurement parameters; measuring signals from a radio channel; evaluating one or more measurement relaxation conditions related to the obtained one or more measurement parameters for measuring signals; and adjusting the measurement of the signals on the basis of the evaluation result.

22 Claims, 8 Drawing Sheets

(56) References Cited

OTHER PUBLICATIONS

3GPP TSG RAN WG1 Meeting #95, R1-1813622; "UE Power Consumption Reduction in RRM Measurements"; Agenda item: 7.2.9.3; Source: Nokia, Nokia Shanghai Bell; Spokane, Washington, US; Nov. 12-16, 2018; 7 pages.
3GPP TSG RAN WG1 #96, R1-1903351; "UE Power Consumption Reduction in RRM Measurements", Source: OPPO; Agenda Item: 7.2.9.3; Athens, Greece; Feb. 25-Mar. 1, 2019, 8 pages.
3GPP TSG-RAN WG2 Meeting #107bis, R2-1913002; "Power Savings for RRM Measurements in NR", Agenda Item: 6.11.6; Source: MediaTek Inc.; Chongqing, China; Oct. 14-18, 2019; 6 pages.
GPP TSG RAN WG1 Meeting #96, R1-1903805; "Summary#5 of UE Power Consumption Reduction in RRM Measurements", Source: Vivo; Agenda Item: 7.2.9.3; Athens, Greece; Feb. 25-Mar. 1, 2019, 59 pages.
European Search Report for Application No. 21206909.0, mailed on Apr. 11, 2022, 12 pages.
3GPP TSG RAN WG2 Meeting #107bis; R2-1912789; "Relaxation of RRM Measurements"; Agenda item: 6.11.6; Source: Intel Corporation; Chongqing, China; Oct. 14-18, 2019; 6 pages.
3GPP TSG RAN WG1 Ad-Hoc Meeting 1901; R1-1900346; "RRM Measurement on Power Saving"; Source: CATT; Agenda Item: 7.2.9.3; Taipei, Taiwan; Jan. 21-25, 2019; 9 pages.
Office Action and Search Report for Chinese Patent Application No. 202111316984.0, mailed on Jan. 19, 2024, 7 pages.
Office Action for Indonesia Application No. P00202109775, mailed on Dec. 29, 2023, 7 pages.
Communication pursuant to Article 94(3) EPC for European Application No. 21206909.0, mailed on Aug. 12, 2024, 10 pages.
Office Action and Search Report for Chinese Patent Application No. 202111316984.0, mailed on Aug. 7, 2024, 11 pages.
Office Action and Search Report for Chinese Patent Application No. 202111316984.0, mailed on Oct. 24, 2024, 15 pages.
Office Action for Indonesia Patent Application No. P00202109775, mailed on Nov. 26, 2024, 4 pages.

\* cited by examiner

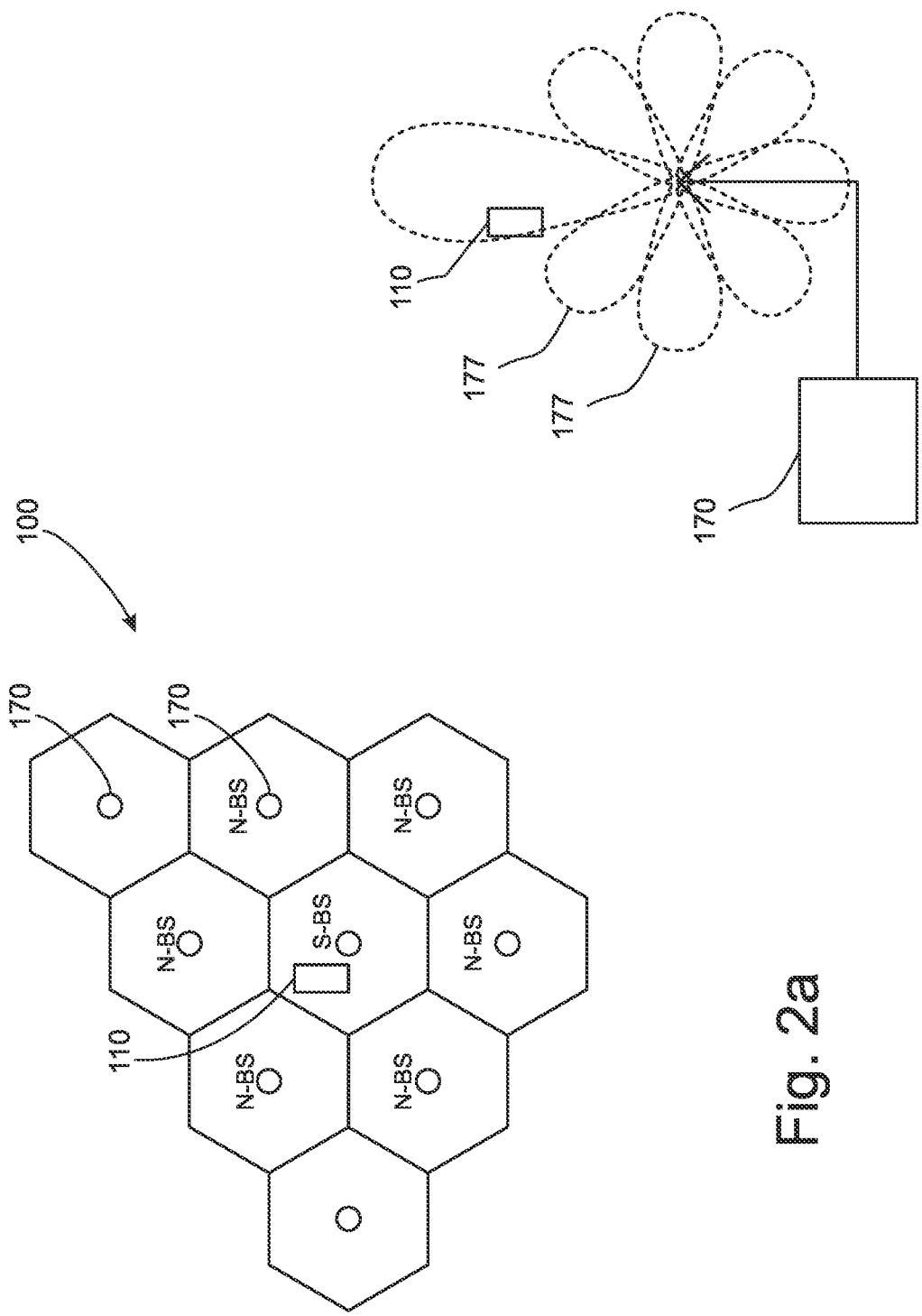

MEASUREMENT ADJUSTMENT IN LOW MOBILITY

CROSS-REFERENCE TO RELATED APPLICATIONS

This application claims priority to Finnish patent application No. 20206131, filed Nov. 9, 2020, entitled "MEASUREMENT ADJUSTMENT IN LOW MOBILITY" which is hereby incorporated by reference in its entirety.

TECHNICAL FIELD

The present invention relates to a method and apparatus for measurement adjustment in low mobility of a user equipment.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

5G-NR ($5^{th}$ generation New Radio) is a new radio access technology which has been developed by the $3^{rd}$ generation partnership project (3GPP) for the $5^{th}$ generation mobile networks. 5G-NR has been specified within 3GPP to be able to coexist with 4G-LTE (Long Term Evolution) within the same spectrum. In 5G systems a base station may have a MIMO (Multiple In Multiple Out) antenna array comprising dozens of individual antenna elements. Signals to and from those antenna elements can be controlled e.g. by signal-processing algorithms so that a good transmission route may be utilized through air to each user equipment. Then the base stations can send individual data packets in many different directions (with different beams). Beamforming allows many users and antennas on such MIMO array to exchange much more information at once, For millimeter waves used in 5G networks, beamforming is primarily used to address a different set of problems: cellular signals are easily blocked by objects and tend to weaken over long distances, wherein beamforming may help by focusing a signal in a concentrated beam that points only in the direction of a user equipment rather than broadcasting in many directions at once. This approach may increase the probability that the signals arrive intact and may also reduce interference for everyone else.

A mobile communication device, which may also be called as a user equipment (UE), performs radio resource management (RRM) measurements such as RSRP and RSRQ for mobility purposes and further measurements related to wireless signal propagation properties on a regular basis, even when the mobile communication device is in an idle or inactive mode of the radio resource control (RRC) protocol for energy efficiency. These measurements consume energy from the energy source of the mobile communication device. Mobile communication devices usually are powered by rechargeable batteries, wherein such measurements may shorten the operation time of the mobile communication device.

SUMMARY

Some embodiments provide a method and apparatus for adjusting measurements activity in order to reduce energy consumption when a user equipment (a mobile communication device) is in an idle or in an inactive mode.

Some embodiments are implemented in the context of the 5G communication systems and relate to a UE implementation of mechanisms for energy efficient radio resource management (RRM) measurements, when operating in an RRC (radio resource control) Idle or Inactive mode. In particular, some embodiments relate to a user equipment supporting RRM measurements relaxation rules introduced in the Rel-16 of 3GPP ($3^{rd}$ Generation Partnership Project) with the aim of reducing the measurement activity whenever a user equipment in an RRC Inactive/Idle mode is in low mobility and/or away from a cell edge, thus reducing the power consumption of the user equipment. In 3GPP terminology this situation in which the user equipment is away from an edge of the radio coverage of a cell is denoted as "not at cell edge". To implicitly enable such relaxation, the network can broadcast the corresponding parameters that control the relaxation trigger criteria (i.e. low mobility, not-at-cell-edge, or both). Whenever fulfilling a trigger criterion, for example the low UE mobility criterion, the user equipment may choose to relax the RRM measurements by performing neighbour cell measurements with longer intervals.

According to an embodiment, there is provided a method, to be employed by a user equipment, to perform energy efficient mobility-status evaluation and corresponding RRM measurements relaxation, which depends on:

(a) radio channel parameter estimates acquired by the user equipment, and (b) a beam-level relaxation evaluation internal of the user equipment.

Based on the channel estimate(s) and beam-level relaxation evaluation outcome, the user equipment can adjust at least one of the following internal measurement parameters when performing the mobility-status evaluation and when applying measurement relaxation (whenever deemed in low-mobility):

the number of (SS/PBCH block, SSB) beams to evaluate within an evaluation period;

the number of measurement samples, the bandwidth to measure, the measurement period, etc., used to collect measurement samples within an evaluation period;

the re-evaluation interval between two subsequent evaluation periods.

As a result, the user equipment may only use energy needed for performing measurements according to the adjusted parameters both during the mobility status evaluation and after the evaluation outcome is known, for example when performing the actual RRM measurements.

According to some aspects, there is provided the subject matter of the independent claims. Some further aspects are defined in the dependent claims. The embodiments that do not fall under the scope of the claims are to be interpreted as examples useful for understanding the disclosure.

According to a first aspect there is provided an apparatus comprising:

means for obtaining one or more measurement parameters;

means for measuring signals from a radio channel;

means for evaluating one or more measurement relaxation conditions related to the obtained one or more measurement parameters based on adjusted parameters for measuring signals; and means for adjusting the means for measuring signals on the basis of the evaluation result.

According to a second aspect there is provided a method comprising:

obtaining one or more measurement parameters;

measuring signals from a radio channel;

evaluating one or more measurement relaxation conditions related to the obtained one or more measurement parameters based on adjusted parameters for measuring signals; and adjusting the measurement of the signals on the basis of the evaluation result.

According to a third aspect there is provided an apparatus comprising at least one processor; and at least one memory including computer program code the at least one memory and the computer program code configured to, with the at least one processor, cause the apparatus to perform at least the following:

obtain one or more measurement parameters;

measure signals from a radio channel;

evaluate one or more measurement relaxation conditions related to the obtained one or more measurement parameters based on adjusted parameters for measuring signals; and adjust the measurement of the signals on the basis of the evaluation result.

According to a fourth aspect there is provided an apparatus comprising:

a first circuitry configured to obtain one or more measurement parameters;

a second circuitry configured to measure signals from a radio channel;

a third circuitry configured to evaluate one or more measurement relaxation conditions related to the obtained one or more measurement parameters based on adjusted parameters for measuring signals; and a fourth circuitry configured to adjust the measurement of the signals on the basis of the evaluation result.

According to a fifth aspect there is provided a user equipment comprising:

means for obtaining one or more measurement parameters;

means for measuring signals from a radio channel;

means for evaluating one or more measurement relaxation conditions related to the obtained one or more measurement parameters based on adjusted parameters for measuring signals; and means for adjusting the means for measuring signals on the basis of the evaluation result.

According to a sixth aspect there is provided a computer program comprising computer readable program code which, when executed by at least one processor, cause the apparatus to perform at least the following:

obtain one or more measurement parameters;

measure signals from a radio channel;

evaluate one or more measurement relaxation conditions related to the obtained one or more measurement parameters based on adjusted parameters for measuring signals; and adjust the measurement of the signals on the basis of the evaluation result.

BRIEF DESCRIPTION OF THE DRAWINGS

For a more complete understanding of example embodiments of the present invention, reference is now made to the following descriptions taken in connection with the accompanying drawings in which:

FIG. 2a illustrates a part of a wireless network having several base stations and an exemplary user equipment;

FIG. 2b illustrates in a simplified manner beams of a base station serving an exemplary user equipment;

DETAILED DESCRIPTION OF SOME EXAMPLE EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

It should be noted here that in this specification, the term 'base station' refers to a logical element containing logical communication system layers (e.g. L1, L2, L3). The base stations of different RATs may be implemented in the same hardware or at separate hardware. It should also be mentioned that although the expressions "each base station" and "each mobile station" or "each user equipment" may be used, these terms need not mean every existing base station, mobile station or user equipment but base stations, mobile stations or user equipment in a certain area or set. For example, each base station may mean all base stations within a certain geographical area or all base stations of an operator of a wireless communication network or a sub-set of base stations of an operator of a wireless communication network.

Figure 1:
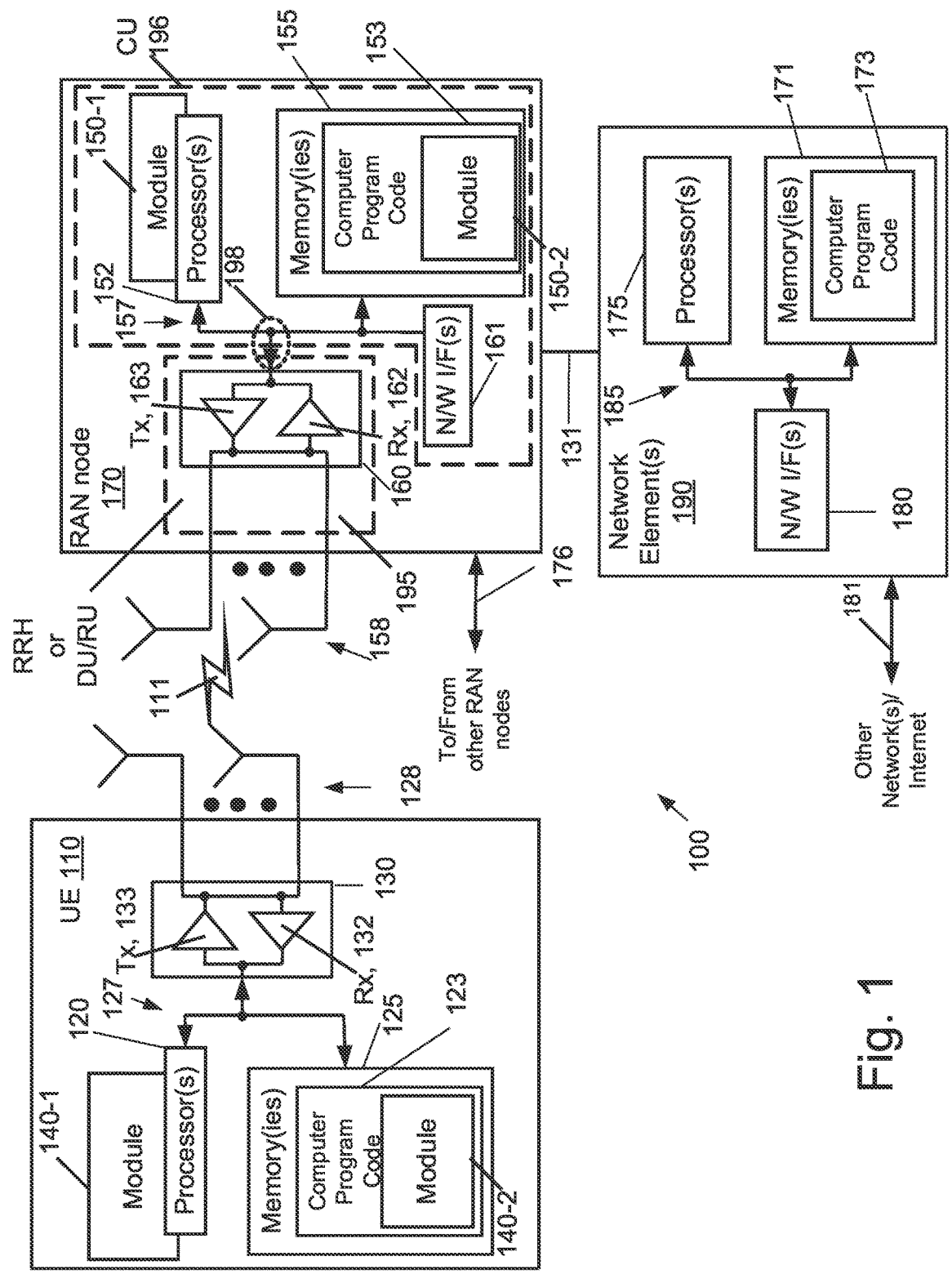
FIG. 1 shows a block diagram of one possible and non-limiting example in which the examples may be practiced.

FIG. 1 shows a block diagram of one possible and non-limiting example in which the examples may be practiced. A user equipment (UE) 110, radio access network (RAN) node 170, and network element(s) 190 are illustrated. In the example of FIG. 1, the user equipment 110 is in wireless communication with a wireless network 100. A user equipment is a wireless device that can access the wireless network 100. The user equipment 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fibre optics or other optical communication equipment, and the like. The one or more transceivers 130 are connected to one or more antennas 128. The one or more memories 125 include computer program code 123. The user equipment 110 includes a module 140, which may be implemented in a number of ways. The module 140 may be implemented in hardware as module 140-1, such as being implemented as part of the one or more processors 120. The module 140-1 may also be implemented as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The user equipment 110 communicates with RAN node 170 via a wireless link 111. The modules 140-1 and 140-2 may be configured to implement the functionality of the user equipment as described herein.

The RAN node 170 in this example is a base station that provides access by wireless devices such as the user equipment 110 to the wireless network 100. Thus, the RAN node 170 (and the base station) may also be called as an access point of a wireless communication network). The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE and connected via the NG interface to a 5GC (such as, for example, the network element(s) 190). The ng-eNB is a node providing E-UTRA user plane and control plane protocol terminations towards the UE and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU 195 may include or be coupled to and control a radio unit (RU). The gNB-CU 196 is a logical node hosting radio resource control (RRC), SDAP and PDCP protocols of the gNB or RRC and PDCP protocols of the en-gNB that controls the operation of one or more gNB-DUs. The gNB-CU 196 terminates the F1 interface connected with the gNB-DU 195. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU 195 is a logical node hosting RLC, MAC and PHY layers of the gNB or en-gNB, and its operation is partly controlled by gNB-CU 196. One gNB-CU 196 supports one or multiple cells. One cell is supported by only one gNB-DU 195. The gNB-DU 195 terminates the F1 interface 198 connected with the gNB-CU 196. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memory(ies) 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195. The modules 150-1 and 150-2 may be configured to implement the functionality of the base station described herein. Such functionality of the base station may include a location management function (LMF) implemented based on functionality of the LMF described herein. Such LMF may also be implemented within the RAN node 170 as a location management component (LMC).

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU 195, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So, if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include location management functions (LMF(s)) and/or access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations such as functionality of an LMF as described herein. In some examples, a single LMF could serve a large region covered by hundreds of base stations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element (s) 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Module 150-1 and/or module 150-2 may implement the functionalities and signaling of the gNB or radio node as herein described. Computer program code 173 may implement the functionalities and signaling of the AMF or network element as herein described.

FIG. 2a illustrates a part of a wireless network 100 having several base stations 170 and an exemplary user equipment 110. In FIG. 2a it is assumed that the base station marked as S-BS is the serving base station, when the user equipment is in connected mode, and the base station where the user equipment is camped on when not in connected mode. Some of the neighbouring base stations are labelled as N-BS in FIG. 2a. In practical situations the serving base station and the camped on base station may change e.g. when the user equipment in moving, or if the signal strength from different base stations changes (e.g. signals from a neighbouring base station N-BS becomes stronger than signals from the currently serving base station.

The serving base station may have assigned one or more beams 177 (FIG. 2b) for the user equipment on the basis of some criteria. For example, that beam which is directed towards the location of the user equipment may be selected for the user equipment and if the user equipment moves to another location, another beam directed towards that new location may be selected instead. In FIG. 2b most of the beams are illustrated being similar to each other and one beam is illustrated to have stronger signal than the others but in practical implementations different beams may have different parameters such as signal strength, width length etc. It should also be noted that the beams depicted in FIG. 2b are only illustrative but in reality the beams may have different forms and sizes.

In accordance with an example, the base station (a.k.a. an access point), may have one or more transmission-reception points (TRP) which transmit transmission beams to be received by user equipment(s).

A base station may have a spatial beam codebook which includes information of beams available by a base station.

A spatial beam codebook may be defined as follows, for example.

A spatial beam codebook of size $N_B$ and whose elements are indexed by b is defined, wherein $b=1, 2, \ldots, N_B$. Each spatial beam (worded as beam henceforth) corresponds to a radiation pattern whose main lobe is uniquely directed to an angular direction with respect to the antenna array broadside in both the azimuth (i.e. horizontal) and zenith (i.e. vertical) planes. The angular direction for the bth beam may be denoted as $(h_b, v_b)$ where $h_b$ and $v_b$ are horizontal angles and vertical angles of the bth beam, respectively.

A beam-frequency resource pool (also worded as resource pool henceforth) may be defined as follows, in accordance with an embodiment.

A beam-frequency resource is a resource for data transmission consisting of a set of subcarriers (i.e. a resource block) that are sent over multiple antennas and whose per-antenna weight is determined by the beam index. Each beam-frequency resource is addressed either by the pair (b, f) or the triplet $(h_b, v_b, f)$ where $f=1, 2, \ldots, N_F^{Global}$ where $N_F^{Gobal}$ is the global total number of frequency resources. The global resource pool can be denoted as $A^{Global}=\{(b, f)|\forall b, \forall f\}$.

The beam-frequency resource pool is the set of paired resources for use by a RAT. In general, the resource pools are non-orthogonal (i.e. may be interfering) to each other.

When a user equipment 110 is in idle mode, the user equipment 110 does not have an active data session (e.g. a phone call, an internet connection, etc.) but should be reachable via signaling (paging) through an appropriate cell. In paging procedure a brief message may be broadcast simultaneously over the entire service area usually in a multicast fashion by many base stations. The user equipment 110 monitors the paging channel for incoming service requests. Such user equipments periodically enter to an active mode of their baseband and/or receivers to synchronize with the network and check for paging messages from the network. Upon reception of a paging message, the user equipment 110 responds to the paging message e.g. by establishing a connection with the base station controlling the cell on which the user equipment 110 is camped. Upon successful connection the user equipment 110 changes to a connected state. Cell selection and/or reselection may happen when the user equipment 110 is in inactive and/or idle mode and has determined that the user equipment 110 should change its serving cell, i.e. it should camp to a more appropriate cell in order to not compromise successful reception of future paging messages and to be able to effectively transfer uplink data. The user equipment 110 may seek to identify a suitable cell based on so-called idle and inactive mode cell measurements and cell selection criteria. Suitable cells are those whose measured attribute meets, for example, the quality selection criteria (s-criteria) for the cell selection procedure. If a suitable cell is not available, the user equipment 110 may try to identify an acceptable cell. In this case, the user equipment 110 may camp on an acceptable cell and starts the cell reselection procedure. The user equipment 110 may implement a so-called discontinuous reception (DRX) method, in which the user equipment 110 may switch off its receiver(s) (e.g. receiver chain(s), antenna panels and elements) avoiding PDCCH monitoring, and enter a low power state for improved energy efficiency. Such DRX method is applicable also when the user equipment is in the RRC inactive or idle state, by applying a DRX cycle that is referred to inactive/idle I-DRX cycle or paging cycle. Then, the user equipment periodically "wakes-up" to monitor for and receive paging indications if present. In some examples, the wake-up period (paging cycle) can be e.g. 0.32 s, 0.64 s, 1.28 s or 2.56 s long, and typically 1.28 s.

When camped on a cell, the user equipment 110 may regularly search for a better cell according to the cell reselection criteria. If a better cell is found that cell may be selected. For such purpose, the UE may measure neighbour cells based on e.g. the neighbours' lists provided by the network. Typically at least once at every DRX cycle, the user equipment 110 may measure RSRP and RSRQ levels of the serving cell to evaluate the so-called cell selection criteria S (S-criteria) comprising criteria relating to the measurement rules for cell re-selection. If the s-criteria are not fulfilled for the serving cell, the user equipment 110 tries to identify a new serving cell. For instance, if the s-criteria are not fulfilled e.g. for a certain number of consecutive DRX cycles, the user equipment 110 may have to initiate measurements of all neighbouring cells regardless of the measurement/priority criteria provided to the user equipment 110 by the network. On the contrary, if one or more s-criterion is fulfilled for the serving cell, the UE need not perform measurements of intra/inter-frequency neighbours in order to limit the RRM measurements performed for cell reselection.

The user equipment 110 is configured by the base station BS to perform the signal level/quality measurements based on the transmitted SSBs sent by the serving base station and neighbouring base stations, where the measurements are made over a set of received downlink reference signals sent by the serving and neighbouring cells. Both the user equipment 110 and the base station BS are aware of the time-frequency location of these signals and their design. As in LTE, in 5G NR the Reference Signal Received Power (RSRP) is defined as the average received power without interference and noise components, and the Reference Signal Received Quality (RSRQ) is defined as the ratio between the RSRP and the Received Signal Strength Indicator (RSSI), where RSSI is the total received power including noise and interference. When the RSRP measurement of its serving cell falls below a threshold relating to the s-criteria (e.g. $S_{(non)IntraSearchP(Q)}$) defined by the network, the user equipment 110 may have to start measuring signals from the neighbouring base stations.

Some RSRP measurement techniques comprise the linear averaging of power contributions of time-frequency samples of a reference signal, i.e. one sample per resource element (RE), carrying the reference signal. In this specification, these are referred as the set of physical samples having a size K.

Moreover, further means have been introduced by 3GPP to control the RRM measurement relaxation for low mobility UEs and/or UEs not at cell edge for UEs in RRC inactive and idle in Release 16.

An example of a system information (SI) element in a system information block (SIB) for informing a user equipment about the parameters related to such relaxed measurements is described below:

```
relaxedMeasurement-r16           SEQUENCE {
    lowMobilityEvalutation-r16       SEQUENCE {
        s-SearchDeltaP-r16               ENUMERATED {
                                             dB3, dB6, dB9, dB12, dB15,
                                             spare3, spare2, spare1}
        t-SearchDeltaP-r16               ENUMERATED {
                                         s5, s10, s20, s30, s60, s120, s180,
                                         s240, s300, spare7, spare6, spare5,
                                         spare4, spare3, spare2, spare1}
    }                                                OPTIONAL,          -- Need R
    cellEdgeEvaluation-r16           SEQUENCE {
        s-SearchThresholdP-r16           ReselectionThreshold
        s-SearchThresholdQ-r16           ReselectionThresholdQ   OPTIONAL        -- Need R
    }    OPTIONAL,       -- Need R
    combineRelaxedMeasCondition-r16          ENUMERATED {true}         OPTIONAL,    -- Need R
    highPriorityMeasRelax-r16                ENUMERATED {true}         OPTIONAL     -- Need R
}        OPTIONAL     -- Need R
``` s-SearchDeltaP-r16 is a parameter which includes the decibel value/range within which a received signal received power (RSRP) measurement value should be during a measurement period to indicate that the user equipment seems to be in a low mobility state. According to this example, the parameter may have one of the following signal strength values (in dB): dB3, dB6, dB9, dB12, dB15. For example, if dB3 is indicated, the measured signal power should not vary more than 3 dB within a determined measurement period. In other words, variations in the measured signal power should be less than 3 dB within the determined measurement period.

The measurement period is indicated with the parameter t-SearchDeltaP-r16 and may have one of the following values, in accordance with an embodiment: s5, s10, s20, s30, s60, s120, s180, s240, s300. The value indicates a time in seconds, i.e. s5 indicates a period of 5 s, s10 indicates a period of 10 s, etc.

cellEdgeEvaluation-r16 is an information element to inform for the mobile device parameter(s) for evaluating whether it is at or near a cell edge. This information element has two parameters in this example: s-SearchThresholdP-r16 and s-SearchThresholdQ-r16.

s-SearchThresholdP-r16 is a parameter indicating an Rx level threshold for cell reselection.

s-SearchThresholdQ-r16 is a parameter indicating a quality level threshold for cell reselection.

combineRelaxedMeasCondition-r16 is a parameter indicating that when both lowMobilityEvaluation and cellEdgeEvaluation criteria are present in the system information block, this parameter configures the user equipment to fulfil both criteria in order to relax measurement requirements for cell reselection. If the field is absent, the user equipment is allowed to relax measurement requirements for cell reselection when either or both of the criteria are met.

highPriorityMeasRelax-r16 is a parameter indicating whether measurements can be relaxed on high priority frequencies. If the field is absent, the user equipment 110 shall not relax measurements on high priority frequencies beyond what a parameter $T_{higher\_priority\_search}$ indicates. The value of the parameter $T_{higher\_priority\_search}$ informs that the user equipment shall search every layer of higher priority at least every $T_{higher\_priority\_search}=(60*N_{layers})$ seconds, where $N_{layers}$ is the total number of higher priority NR and E-UTRA carrier frequencies broadcasted in system information.

According to an embodiment, the low mobility criterion can be evaluated as follows:

The user equipment is defined to be in a low-mobility state, if the difference between a serving cell reference value for the received signal power level SrxlevRef and a current received signal power level (RSRP) Srxlev of the serving cell is smaller than the value of the parameter SSearchDeltaP within the time indicated by the TSearchDeltaP parameter, i.e. if the following condition is true:

(SrxlevRef−Srxlev)<SSearchDeltaP within TSearchDeltaP     (1)

The SrxlevRef is set to the value of the Srxlev after (re-)selecting a new cell or if (SrxlevRef−Srxlev)>0 or if the criterion has not been met for TSearchDeltaP.

Figure 3A:
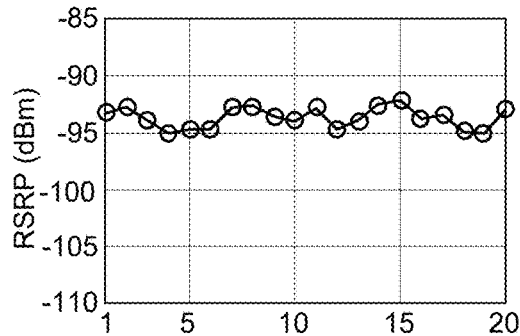
FIG. 3a shows an example of RSRP evolution in time for a user equipment which is not moving.
Figure 3B:
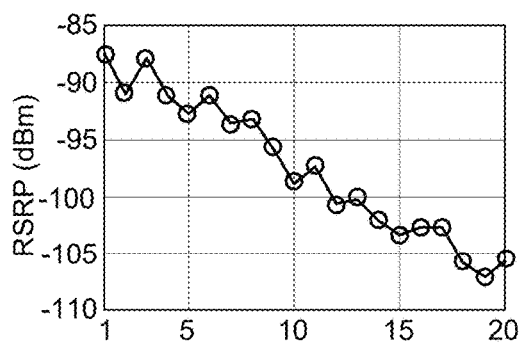
FIG. 3b shows examples of RSRP evolution in time for a mobile user equipment.

From the equation above it can be noticed that the user equipment should perform a mobility-status evaluation based on the RSRP measured on the serving cell and determine whether the RSRP level is "constant" in a period (i.e. within the network defined threshold SSearchDeltaP). This relies on the fact that if the RSRP remains rather constant in time (i.e. undergo a variation within a few dB), this likely indicates that the user equipment can be considered "low mobile" or semi-stationary. An example is illustrated in FIG. 3a in which the measured RSRP value is quite constant whereas FIG. 3b illustrates an example situation in which the measured RSRP value varies during succeeding measurement periods thus indicating that the user equipment seems to be moving, i.e. is not "low mobile" nor stationary. Circles in FIGS. 3a and 3b illustrate different (succeeding) measurement results of the RSRP. In the situation illustrated by FIG. 3a it might be safe to relax RRM measurements for power saving for the user equipment.

A typical smartphone/tablet, which are non-limiting examples of the user equipment, can be expected to be in RRC Idle/Inactive mode during most of the day, interleaved by relative short data transfer events for which the user equipment has to move to the RRC Connected mode. Reason for this is that the RRC mode of a user equipment 110 depends primarily on the user-plane activity (based on the end user's traffic pattern and activity) and the network configuration of a (UE-specific) RRC release timer based on data inactivity. Typically, after about 10 seconds of data inactivity, the network is likely to move a user equipment out of RRC Connected for saving both radio resources and user equipment power consumption of the user equipment. Furthermore, the support of small data transfer while a user equipment is in RRC Inactive, i.e. without the transition to RRC Connected, will increase further the percentage of time in which the user equipment is not in RRC Connected.

In addition, a typical smartphone/tablet can be low-mobile or even stationary, for instance during long periods where the end-user places the phone on his/her office desk and at home.

Therefore, there is large potential in reducing the measurement activity in RRC Inactive/Idle whenever in low mobility and/or not-at-cell-edge. This is confirmed also when looking at an energy consumption model of the user equipment assumed for RRM measurements given in Table 1 as slot average numbers (from TR 38.840). The consumption is a function (among others) of the number of searched and measured cells. For reference, the basic PDCCH decoding process is defined to consume 100 power units per slot, while deep sleep requires 1 power unit per slot.

TABLE 1

UE power consumption model for RRM measurements

| Intra-frequency action | Number of cells | Relative Power | | | |
|---|---|---|---|---|---|
| | | Synchronous case | | Asynchronous case | |
| | | FR1 | FR2 | FR1 | FR2 |
| Measurement | 8 | 150 | [225] | 170 | [285] |
| | 4 | 120 | [195] | 140 | [255] |
| Measurement & search | 8 | 200 | [320] | 220 | [380] |
| | 4 | 170 | [290] | 190 | [350] |
| Neighbour cell search | Independent | 150 | [270] | 150 | [270] |

Synchronous case: SSB transmissions from cells are time-aligned e.g., timing of $SSB_i$ from $cell_i$ is aligned with timing of $SSB_j$ from $cell_j$.
Asynchronous case: SSB transmissions from cells are not time-aligned e.g., timing of $SSB_i$ from $cell_i$ is not aligned with timing of $SSB_j$ from $cell_j$ In order to trigger the RRM measurement relaxation for low mobility, the mobility status detection should be sufficiently accurate inter alia to avoid negative impact to mobility performance related to cell reselection and, at the same time, it should consume low power to avoid outweighing the benefits. Similar considerations apply to the not-at-cell edge condition.

In the following, several mechanisms to perform the mobility-status evaluation to determine whether the RSRP is "constant" (for the low mobility condition) or above the network-defined threshold (for not-at-cell edge condition) and to relax its RRM measurements of the neighbour cells for UE power saving are described.

Figure 4:
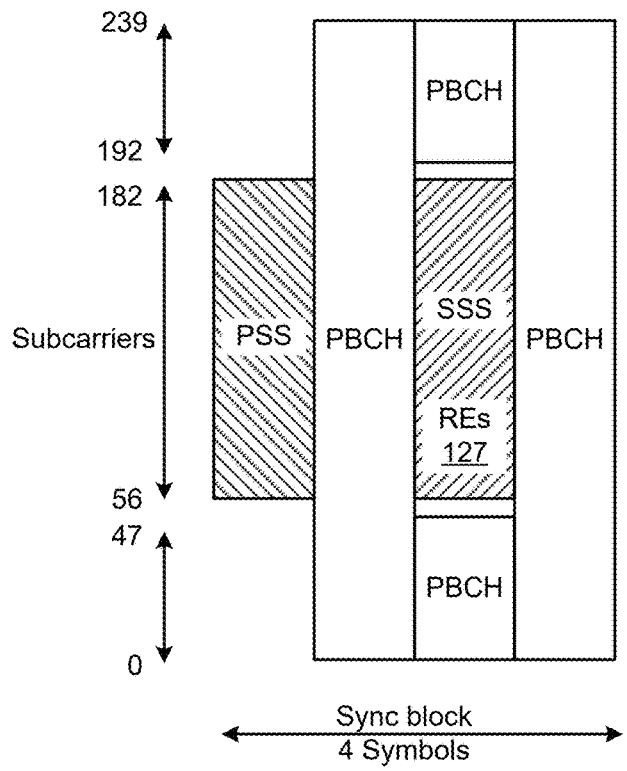
FIG. 4 illustrates an example of an SSB information element transmission using a plurality of subcarriers.

The RRM measurements in the scope of some embodiments are primarily measurements of the received signal received power RSRP and/or the received signal received quality RSRQ for use for mobility purposes (i.e. cell quality measurements for cell reselection). Differently from measurements in LTE (Long Term Evolution) systems, where RSRP and RSRQ are based on Cell specific Reference Signal (CRS), the RSRP and RSRQ definitions in NR for UEs in RRC inactive/idle are based on the SS/PBCH blocks (SSBs) as there is no CRS in NR. The SS/PBCH block (SSB) burst consists of multiple SSBs (shown in FIG. 4), which are associated with different SSB indices and potentially with the different transmission beams. In general, however, these RRM measurements could also be performed based on Tracking Reference Signals (TRS), which are DL reference signals meant to be used by UE for fine time-frequency tracking. Furthermore, additionally or alternatively, Channel State Information RS (CSI-RS) could be used as well.

When the user equipment is in the RRC_Idle or RRC_Inactive mode, typically the user equipment only needs to measure cells e.g. at every paging opportunity of the serving cell, so according to the paging cycle, and at least every $T_{measure,NR\_Intra}$ and $T_{measure,NR\_Inter}$ seconds for intra-frequency and inter-frequency cells, respectively that are identified and measured according to the measurement rules.

A user equipment which is in the RRC_Idle or RRC_Inactive mode can measure multiple beams (i.e. signals transmitted during SSBs at different beams) of a cell at least once, and the results of those measurements (power values) are averaged to derive the cell quality. In doing so, the user equipment is configured to consider a subset of the detected beams. Basically, the cell-level measurement quantity used for cell reselection may be defined as the linear average of the measurement quantity values (RSRP) of the beams which are above a network defined threshold (absThreshSS-BlocksConsolidation). The number of beams to be used in the averaging may be defined by a parameter nrofSS-BlocksToAverage. In accordance with an embodiment, the value of the parameter nrofSS-BlocksToAverage is between 2 and 16 but may be different from that. Furthermore, the value of the parameter nrofSS-BlocksToAverage may change at different times. If none of the beams is above the threshold, the user equipment may consider the cell measurement quantity to be equal to the highest beam measurement quantity. In a multi-beam environment, the user equipment which is in the RRC_Idle or RRC_Inactive mode, may prefer reselecting to a cell with a higher number of quality beams. The user equipment may reselect to the cell with the highest number of beams above a threshold (i.e. abs ThreshSS-BlocksConsolidation threshold) among the cells whose measurement quantity value is within the rangeTo-BestCell of the R-criterion value of the highest ranked cell.

In some situations, the user equipment may skip neighbour cell measurements almost completely (e.g. by applying a very large measurement period) if the user equipment is in a low-mobility state and is not at a cell edge whereas in some other situations the user equipment may not be allowed to skip neighbour cell measurements completely if the user equipment is in a low-mobility state and is not at a cell edge.

The user equipment should perform intra- and inter-frequency neighbour cell measurement during the time defined by the parameter TsearchDeltaP after cell (re-) selection.

A cell selection received signal level value (a.k.a. a cell quality) Srxlev may be computed on the basis of results of measurements for cell selection and reselection purposes. The Srxlev may be defined as follows:

$$\text{Srxlev} = Q_{rxlevmeas} - (Q_{rxlevmin} + Q_{rxlevminoffset}) - P_{compensation} - Q_{offsettemp} \quad (2)$$

where
  Srxlev is a cell selection RX level value (dB);
  $Q_{offsettemp}$ is an offset temporarily applied to a cell;
  $Q_{rxlevmeas}$ is a measured cell RX level value (RSRP);
  $Q_{rxlevmin}$ is a minimum required RX level in the cell (dBm);
  $Q_{rxlevminoffset}$ is an offset to the signalled $Q_{rxlevmin}$ taken into account in the Srxlev evaluation as a result of a periodic search for a higher priority PLMN while camped normally in a VPLMN; and
  $P_{PowerClass}$ is the maximum RF output power of the UE (dBm) according to the UE power class.

The $P_{compensation}$ may be defined as follows: For a first frequency range FR1, if the user equipment supports the additionalPmax in the NR-NS-PmaxList, if present, in system information blocks SIB1, SIB2 and SIB4: $P_{compensation} = \max(P_{EMAX1} - P_{PowerClass}, 0) - (\min(P_{EMAX2}, P_{PowerClass}) - \min(P_{EMAX1}, P_{PowerClass}))$ (dB); else, i.e. if the user equipment does not support the additionalPmax in the NR-NS-PmaxList, $P_{compensation} = \max(P_{EMAX1} - P_{PowerClass}, 0)$ (dB). For a second frequency range FR2, $P_{compensation}$ is set to 0.

In 5G the first frequency range FR1 is 450 MHz-6000 MHz, and the second frequency range FR2 is 24250 MHz-52600 MHz, but in some other wireless communication systems these frequency ranges may differ from those used in 5G and it may also be possible that only one frequency range is in use or more than two separate frequency ranges are in use.

The value of the Srxlev may be used in determination of a cell selection criterion (S-criterion). For example, the cell selection criterion is fulfilled when Srxlev>0 dB, but also a different value than 0 dB may be used in different embodiments.

The user equipment should measure Srxlev for cell quality (to find out whether the S-criterion is fulfilled) based on the nrofSS-BlocksToAverage SSBs.

The re-evaluation of S-criterion for a cell is relaxed to happen at least once every M1*N1 DRX cycles (e.g. every 8 DRX cycles). It should be noted that the low-mobility evaluation and S-criterion evaluation may likely not happen in parallel, therefore the user equipment could measure Srxlev for low-mobility evaluation differently than Srxlev for S-criterion.

In the following, some embodiments of a method are described to be employed by a user equipment, and a user equipment, to perform energy efficient mobility-status evaluation and corresponding RRM measurements relaxation, which depends on radio channel parameter estimates acquired by the user equipment, and a user equipment-internal beam-level relaxation evaluation. Although the description below focuses on the mobility-status evaluation to determine the low-mobility condition, the described method is applicable when—alternatively or additionally— the cell edge evaluation and related not-at-cell edge condition is considered. This means that the described method is applicable when either the low mobility condition applies or the not-at-cell edge condition applies, as well as when both conditions apply.

Figure 5:
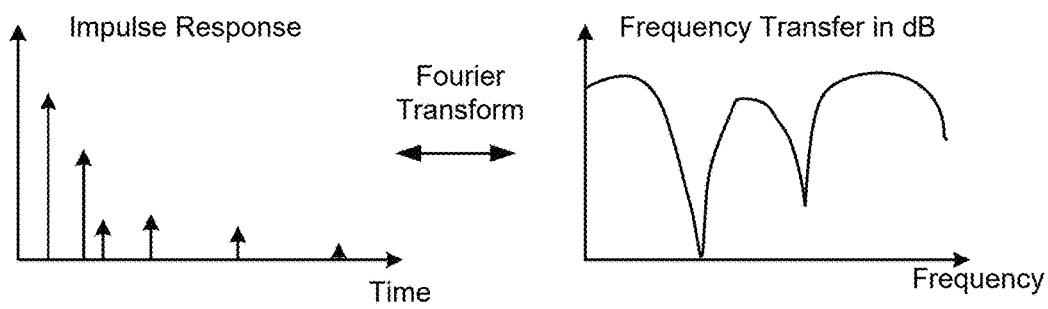
FIG. 5 shows an example of variations of a channel in the frequency domain.

Estimating the radio channel and its characteristics may be based on observing metrics from the received signal. There may be several different characteristics to observe, but in the discussion of different embodiments so called key characteristics of the channel used in some embodiments are doppler spread and delay spread. When the user equipment is moving relatively slowly, a small doppler spread can be expected which in turn means a small variation of channel over time, whereas increasing the speed of movement of the user equipment is assumed to cause increased doppler spread. If a small delay spread is measured from a Power Delay Profile (PDP), this can be indicative of a small variation in frequency domain as show in FIG. 5.

Figure 6:
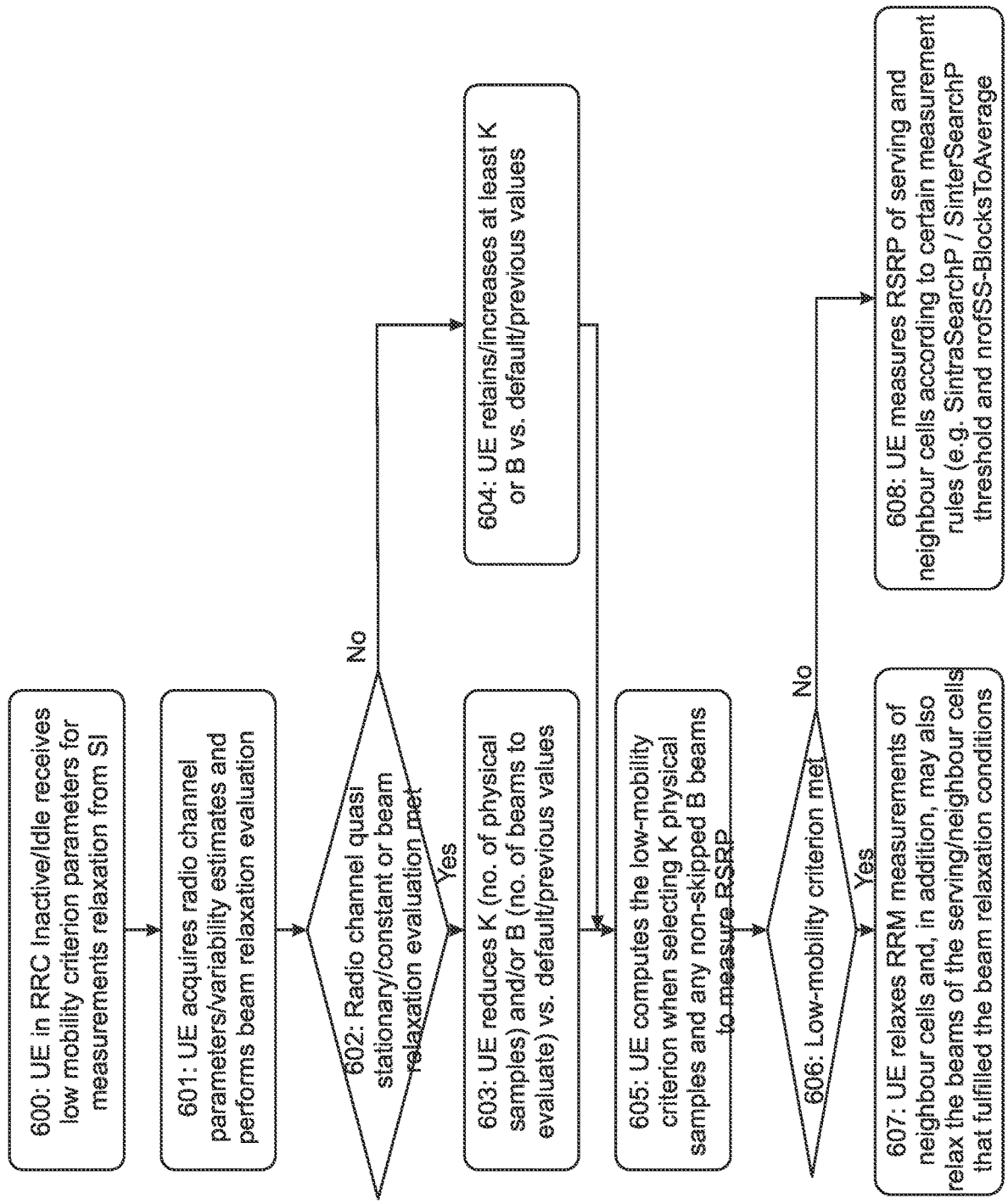
FIG. 6 illustrates some operations of a method, in accordance with an embodiment.

The flow diagram of FIG. 6 illustrates some operations regarding the method of an embodiment. It is assumed that the user equipment 110 is not in a connected mode (RRC_Connected) but is either in an idle mode (RRC_Idle) or in an inactive mode (RRC_Inactive).

Initially, the user equipment 110 may have a parameter indicative of which beams are to be evaluated among all existing beams at the region where the user equipment 110 is located. The parameter nrofSS-BlocksToAverage SSBs may be used to indicate the number of beams B be used in the averaging. It may also happen that all the existing beams are initially selected for evaluation.

The user equipment 110 may have a parameter memory 1039 (FIG. 9) for storing parameters such as parameter(s) related to mobility criterion received from the communication network e.g. in a signal information element (SI). This is illustrated with the block 600 in the flow diagram of FIG. 6.

The user equipment 110 may have a signal strength measurement unit 1036 which is able to measure the strength (power) of the received signal (RSRP) at certain times. The signal strength measurement unit 1036 may form samples of the measured signal wherein values of samples indicate the measured property of the signal e.g. a level of the signal. For synchronization signal reference signal received power (SS-RSRP) determination, demodulation reference signals for physical broadcast channel (PBCH) and, if indicated by higher layers, channel state information reference signals (CSI-RS) in addition to secondary synchronization signals may be used. SS-RSRP using demodulation reference signal for PBCH or CSI reference signal may be measured by linear averaging over the power contributions of the resource elements that carry corresponding reference signals taking into account power scaling for the reference signals. Therefore, the signal strength measurement unit 1036 may be synchronized with the signals to be measured so that samples are taken only at those times when the signal is assumed to be transmitted by a beam of a cell.

A signal quality analyzing unit 1037 may analyse the samples of the measured signal to estimate certain radio channel parameters based on e.g. the SS Block RS (e.g. PSS/SSS or DMRS for PBCH) to determine time/frequency channel variability. These operations are illustrated with block 601 in the flow diagram of FIG. 6. This estimation may include at least determining a delay spread estimate (from PDP) as an indication of frequency selectivity of the channel (coherence bandwidth) and determining a Doppler spread estimate (based e.g. on auto-correlation function of the channel estimates) as an indication of time-invariant coherence time, as will be described later in connection with FIG. 7.

At step 602 a signal analyser 1038 performs beam relaxation evaluation on the basis of the signal properties. The beam relaxation evaluation can be based e.g. on the relative/absolute RSRP/RSRQ threshold applied to the RSRP/RSRQ beam value(s) or it can be based on the semi-stationarity of the channel (derived based on SSB RS, DMRS), and/or a combination of both (channel properties and RSRP/RSRQ thresholds). This is illustrated with block 602 in the flow diagram of FIG. 6. The signal analyser 1038 may compare possible variations in the signal strength value within a predetermined time to a corresponding threshold parameter (a quasi-stationary threshold) to find out whether the signal strength varies less than or more than the threshold.

If the signal analyser 1038 deduces that the radio channel is quasi stationary, the process continues to relaxation of measurement activity in step 603. Otherwise the process continues to retainment or increment of the measurement activity in step 604.

In the relaxation of measurement activity step 603 relating to controlling how to perform measurements for a relaxation evaluation phase, a channel measurement controlling unit 1040 deduces that one or more of the previously selected beams can be left out from evaluation i.e. "relaxed", wherein the number of beams B to be evaluated (among those beams which are in use in the base station transmitting the signals to be measured) may be reduced. An exemplary beam evaluation algorithm will be described later.

In addition to or alternatively, the channel measurement controlling unit 1040 may deduce that less number K of resource elements to measure per beam than in the previous measurement cycle is enough i.e. the number K can be reduced. Hence, the number of beams B and/or the number of samples K to be used in the signal analyses by the signal analyser 1038 at a succeeding measurement phase may be reduced.

In the increment of the measurement activity step 604 the channel measurement controlling unit 1040 increases or retains the number of beams B to be evaluated and/or the number of samples K to be used in the signal analyses by the signal analyser 1038 at a succeeding measurement phase.

In block 605 a mobility analyser 1041 computes a low-mobility criterion. This may be performed, for example, as was explained above in connection with the equation (1). It may also be possible to utilise sensors of the user equipment. For example, the user equipment may have an accelerometer which indicates when the user equipment is not in a steady state. Also a positioning receiver may be utilised to determine whether the location indicated by the positioning receiver is constant or changing. If the location is changing it may still indicate low motion if the location changes are small. A gyroscope may further be used to detect if the user equipment is rotating, for example.

If the mobility analyser 1041 determined that the low-mobility criterion is met by the user equipment 110, the operation continues to step 607 in which the user equipment relaxes RRM measurements of neighbour cells and may also relax measurements of those beams of the serving cell and/or a neighbouring cells which fulfilled the beam relaxation conditions. The UE has to take into account information in the network configuration and/or specifications about the maximum allowed relaxation level. However, it is noted that the relaxation level that the UE may choose to apply (e.g. to the neighbour cell measurements) may depend on which conditions are met (e.g. low mobility condition only, not-at-cell-edge condition only, or both conditions). For instance, when both conditions apply, the number of beams and/or samples to be measured according to the described method may further be adjusted (e.g. reduced) as compared to the case when either condition applies (e.g. only the low-mobility condition applies) since further relaxation may be safer to apply by a UE located at the cell center and being in low mobility. It is also noted that when both conditions apply, the UE may choose to keep monitoring only a single condition more frequently (e.g. low mobility condition only), while decreasing the frequency to re-evaluate the second condition (e.g. the not-at-cell-edge condition) since as long as the UE is deemed in low mobility the outcome of the not-at-cell-edge evaluation is not supposed to change rapidly.

On the other hand, if the mobility analyser 1041 determined that the low-mobility criterion is not met by the user equipment 110, the operation continues to step 608 in which the user equipment continues to measure RSRP of the serving cell and neighbouring cells according to predetermined measurement rules (for example SintraSearchP/SinterSearchP threshold and nrofSS-BlocksToAverage).

Figure 7:
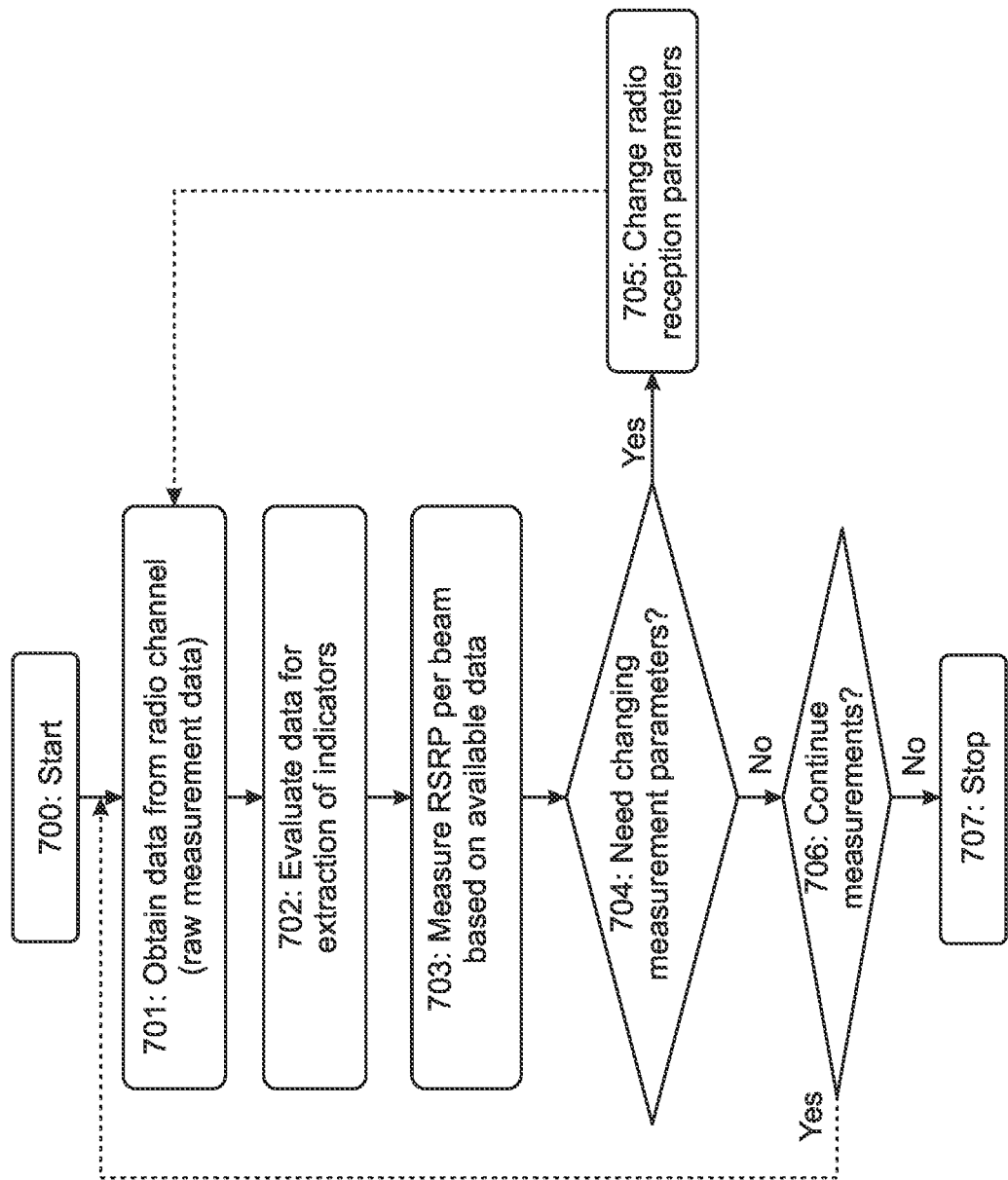
FIG. 7 shows an exemplary flow chart illustrating operations of a user equipment when estimating whether a radio channel is quasi-stationary in time vs. varying in time, in accordance with an embodiment.

FIG. 7 shows an exemplary flow chart illustrating a potential implementation of the operations of the user equipment 110 at steps 601 and 602 of FIG. 6, i.e. estimating whether the radio channel is quasi-stationary in time vs. varying in time.

The radio front end of the user equipment 110 obtains data from radio channel as raw measurement data (step 701). This data may be evaluated by a received data evaluation unit 1042 for extraction of indicators (step 702). The signal strength measurement unit 1036 uses these indicators for measuring strength of the received signal (RSRP) per measured beam at certain times (step 703). The received data evaluation unit 1042 may estimate certain radio channel parameters based on e.g. the SS Block RS (e.g. PSS/SSS or DMRS for PBCH) to determine time/frequency channel variability. This estimation may include at least 1) determining a delay spread estimate (from PDP) as an indication of frequency selectivity of the channel (coherence bandwidth); and 2) determining a Doppler spread estimate (based e.g. on auto-correlation function of the channel estimates) as an indication of time-invariant coherence time.

As an alternative or in addition, the UE could also use the DMRS associated to Coreset #0 (initial BWP) identified in PBCH to increase the channel estimate accuracy.

FIG. 7 further illustrates that if the examination revealed in block 704 that channel radio reception parameters should be amended, a channel measurement controlling unit 1040 may adjust parameters regarding the channel measurements. For example, the channel measurement controlling unit 1040 performs operations for the adjustment of the number of samples K to be taken in the channel measurements and/or the number of beams B to be evaluated by the user equipment (step 705).

The above operations may be repeated (step 706) by continuing the measurements or the measurements may be stopped until initiated again at a later stage.

When examining whether the low-mobility condition is fulfilled, it may also be possible to examine whether the user equipment 110 is rotating. The rotation of the user equipment can be an additional factor to take into account when determining if the channel is quasi-stationary. When operating in Frequency Range 2 (FR2), the user equipment will likely be implemented with multiple panel arrays to provide quasi-omni coverage around the user equipment. A rotating user equipment could lead to the need for the user equipment to continuously update which panel is best to use for communicating with the gNB. Therefore, an additional condition for a quasi-stationary environment can be for the user equipment to be not rotating, where the user equipment can leverage internal orientation sensors to determine whether or not the user equipment is rotating. However, if the user equipment is rotating while the rest of the environment is stationary, it is possible that the best gNB beam (SSB or CSI-RS) will stay the same over time, but the user equipment's best panel for receiving the best gNB beam would likely change, which could lead to variations in the measured RSRP from the best gNB beam over time. On the other hand, in certain situations, a rotating user equipment may lead to the best gNB beam changing over time simply due to the rotation of the user equipment (e.g., the best beam could originate from different transmission-reception points (TRPs) over time). As a result, the best approach may be for the user equipment to use the lack of any rotation as one of the necessary conditions for a quasi-stationary channel.

In the following, some details on how the user equipment may estimate delay spread and Doppler spread are provided, in accordance with an embodiment.

The signal sent by a transmit antenna via a wireless channel propagates to a receiver antenna via many different paths due to the presence of reflectors and scatterers in the environment.

The receiver antenna observes a sum of many distorted copies of the transmitted signal, having different amplitudes, time delays, phase shifts, and angles of arrival. This is referred to as multipath propagation.

The multipath propagation leads to multiple types of variations of the signal such as signal fading, delay spread, and Doppler spread.

The user equipment 110 can determine and use an estimate of its observed delay spread from a Power Delay Profile (PDP), which characterize the multiple paths composing the signal according to the power level of a received path and corresponding delay of arrival.

The user equipment 110 can match the measured Power Delay Profile against known distributions using some model parameters such as number of paths, path delays. It should be noted that the power delay profiles for typical environments are known (e.g. PDP for vehicular, pedestrian, typical urban environments, etc, are available in 3GPP technical reports).

Once the delay spread D is computed, if the delay spread estimate is below a threshold or within a certain range (based on UE-internal parameters), this is indicative of low frequency selectivity of the channel and high coherence bandwidth.

The user equipment 110 could alternatively apply thresholds and/or a given range to the coherence bandwidth estimate. It is noted here that there is an inverse proportionality between the delay spread D [sec] and the coherence bandwidth Bc, where Bc~1/D [Hz].

The user equipment 110 can determine and use an estimate of its observed Doppler spread estimate based on applying the autocorrelation function of the time/frequency-domain channel estimates acquired over several OFDM symbols. For OFDM-based system such as NR, frequency based estimation may be derived.

The user equipment 110 could use (internal) threshold and/or range values to determine whether the estimated Doppler spread is indicative of low motion speed of the user equipment 110.

A small Doppler Spread is an indication of small variation of channel over time and of time-invariant coherence time.

There is an inverse correlation between the maximum Doppler Spread and coherence time.

After estimating whether the radio channel is quasi-stationary in time vs. varying in time, the user equipment 110 determines whether one or more beams can be relaxed (e.g. skipped) compared to the network defined parameter (i.e. nrofSS-BlocksToAverage).

The beam relaxation evaluation is an internal procedure of the user equipment based on internal criteria and/or conditions of the user equipment. In accordance with an example of the 5G system, the maximum number of beams in the second frequency range FR2 is 64 and the maximum number for the number of SS blocks to average to determine cell measurement, maxNrofSS-BlocksToAverage, is currently 16.

An exemplary beam evaluation algorithm comprises the following operations:

The user equipment 110 evaluates whether a beam within the identified set of beams nrofSS-BlocksToAverage fulfills one or both of relative relaxation conditions and absolute relaxation conditions.

The relative relaxation conditions include, for example, that RSRP detected for the beam is a certain threshold below the cell level quality for a given period. The detected RSRP may be based e.g. on the nrofSS-BlocksToAverage beams.

In accordance with an example, the cell-level measurement quantity is the linear average of the measurement quantity values (RSRP) of nrofSS-BlocksToAverage SSBs (2 . . . 16) above a network defined threshold (i.e. absThreshSS-BlocksConsolidation).

The absolute relaxation conditions include, for example, that no signal is observed or the observed signal for the beam is below a threshold for a given period, e.g. −110 dBm (of RSRP).

In the following, operations the user equipment may perform for any beam that fulfils at least one relaxation condition are described in accordance with an embodiment:

- The user equipment can adapt the measurement period of the given beam for user equipment power saving,
- The user equipment can skip measuring that beam altogether for user equipment power saving,
- The user equipment could completely drop measuring any other beam of the serving cell except for the strongest beam.
- The user equipment could apply further relaxation also on the neighbour cells (that may be relaxed using e.g. a longer measurement period, if the user equipment is in low-mobility).

The relaxation during an evaluation period may be related to a serving cell, while generally the relaxation to the measurements of the neighbour cells apply also outside the relaxation evaluation period.

The user equipment may further compute the per-beam L1-RSRP measurements necessary for the mobility status evaluation and check whether the low-mobility criterion is fulfilled. The measurement samples are taken when adjusting B (the number of beams to measure among the nrofSS-BlocksToAverage SSBs) based on the evaluation whether one or more beams can be relaxed as described above, and K (the number of REs to measure per beam) based on the channel variability estimated in the determination whether the radio channel is quasi-stationary in time vs. varying in time as described above (blocks 603, 604, 605, and 606 in the flow chart in FIG. 6).

In general, the lowest values of KB can be chosen, if the channel is deemed quasi-stationary and vice-versa.

For example, the evaluation can consider only the strongest beam (B=1), and a low number of samples for that beam (e.g. K=10), to minimize power consumption during the evaluation.

Wide-band measurements (larger K) can be chosen when the radio channel is slowly varying to decrease the observed variation across time The number of samples, K, can be chosen independently of the number of beams B since K would determine the accuracy of the measurement on a given beam.

Once K and B are chosen for an evaluation, K contiguous Resource Elements (RE) per beam are selected e.g. randomly within the SSS's REs over which the UE measures the L1-RSRP samples during TSearchDeltaP (averaging at least 2 measurements spaced at least half DRX cycle as per TS 38.133) for each of the selected B beams (selected in order of RSRP strength).

Once K is determined, it is used for the entire evaluation period and even across subsequent evaluation periods as long as the estimate variability of the channel does not change (much). The channel has not changed significantly if a second channel estimate does not deviate considerably from the first channel estimate within the observation period. A threshold may be defined within which the estimate should stay in order to deduce that the channel has not changed.

The same part of the band (same physical samples, REs) is measured at all measurement time points during the evaluation period, TSearchDeltaP, to establish a common reference for measurements for the measurements.

As it was shown above in equation (1), the low-mobility criterion can be computed within TSearchDeltaP according to (SrxlevRef−Srxlev)<SSearchDeltaP.

The user equipment 110 determines and enforces associated actions upon concluding on a low-mobility-evaluation including potentially relaxing the RRM measurement of neighbour cells as well as computing a re-evaluation interval for the next low-mobility-evaluation (steps 707 and 608 in FIG. 6).

In accordance with an embodiment, if the low-mobility criterion is fulfilled, the user equipment 110 relaxes the RRM measurements of neighbour cells and computes a first (longer) re-evaluation interval (in terms of number of DRX cycles) controlling when a subsequent low-mobility evaluation should take place. Its length will depend on the estimated channel variability and it will be set to a longer value if the channel variability is deemed low and vice-versa.

The user equipment 110 may also adjust at least one measurement parameter to apply to a subsequent low-mobility evaluation, e.g. decreasing the value of B for using a reduced amount of beams (lower than nrofSS-BlocksToAverage SSBs) since the purpose is not a cell quality measure, but a good indication of low mobility.

If the low-mobility criterion is not fulfilled, the user equipment 110 measures RSRP of serving and neighbour cells according to certain legacy measurement rules (e.g. SintraSearchP/SinterSearchP threshold and nrofSS-BlocksToAverage). The user equipment 110 also computes a second (shorter) re-evaluation interval. Its exact value will depend on the channel variability. Default parameter values as the function of channel variability estimate can be stored and used by the user equipment 110, where these default values can be optimized based on, for example, laboratory tests.

In accordance with an embodiment, the method described above is applicable when either the low mobility condition applies or the not-at-cell edge condition applies, as well as when both conditions apply.

However, the relaxation level that the UE may choose to apply to the neighbour cell measurements may depend on whether the low mobility condition is met or the not-at-cell edge condition is met or if both these conditions are met, for example according to information in the network configuration or specifications.

Furthermore, when both these conditions apply, the number of beams and/or samples to be measured according to the method described above may further be adjusted (e.g. reduced) as compared to the case when only either of the conditions applies (e.g. only the low-mobility condition applies) since relaxation may be even safer to apply by a UE located at the cell center while in low mobility.

Figure 10:
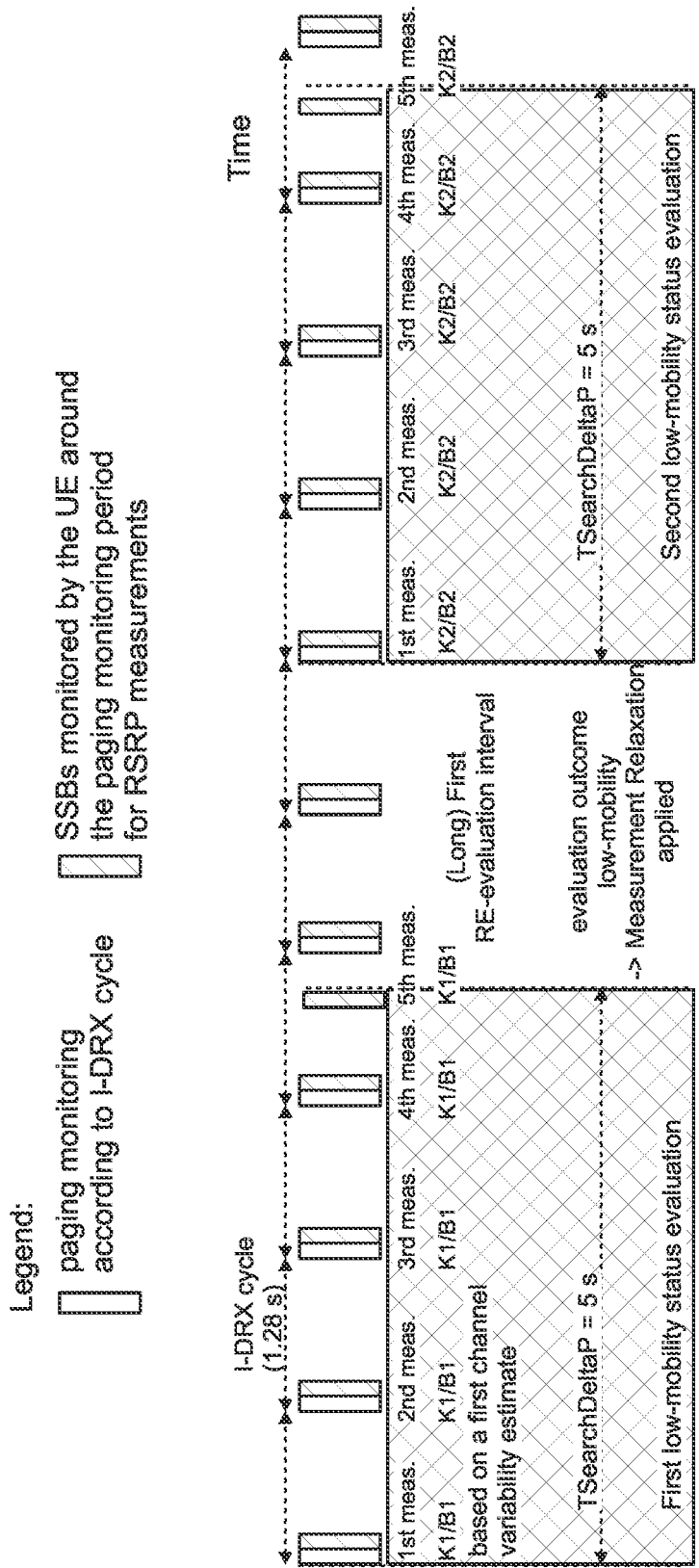
FIG. 10 is an exemplary illustration of a mobility status evaluation as a timing diagram, in accordance with an embodiment.

In the following, an illustrative example will be described with reference to the timing diagram of FIG. 10.

Figure 8:
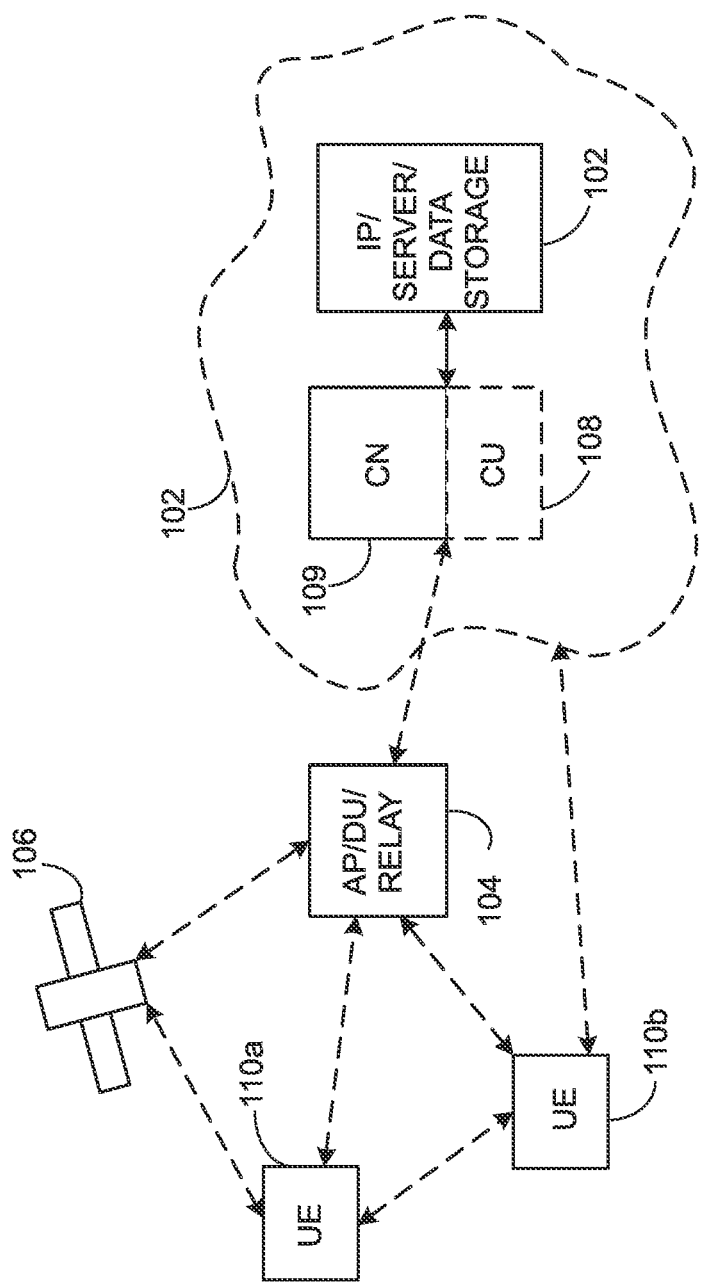
FIG. 8 shows a part of an exemplifying wireless communications access network in accordance with at least some embodiments.

An exemplary illustration of the associated user equipment operations when employing the method of mobility status evaluation is shown in FIG. 8 for a user equipment 110 configured with a DRX/paging cycle in RRC Idle/Inactive of 1.28 s (performing RSRP measurements once per DRX cycle), and TSearchDeltaP=5 sec.

During a first "mobility status evaluation" (illustrated with cross-hatched areas in FIG. 10), the user equipment 110 measures SS-RSRP (Srxlev) when using a first value K1 for K (no. of physical samples used for measuring), where K1 is dynamically adjusted based on a first channel estimate; and a first value B1 for B (no. of beams to evaluate on), where B1 is dynamically adjusted according to a "beam relaxation condition" and potentially the first channel estimate.

During a second (and potentially further) "mobility status evaluation", the user equipment 110 will measure SS-RSRP (Srxlev) by retaining the same K1 as well as the exact same set of physical samples of size K1 as applied in the first "mobility status evaluation", if the channel has not changed significantly.

If the channel has changed above a threshold, the user equipment 110 will compute a new value K2 for K based on the second channel estimate.

By applying B2≤B1, where B2 is dynamically adjusted according to the "beam relaxation conditions" discussed above in the determination whether one or more beams can be relaxed, and potentially the first and second channel estimates.

During any evaluation period, the user equipment 110 may check whether (SrxlevRef−Srxlev)<SSearchDeltaP is fulfilled.

In accordance with an embodiment, the relaxation is applied to neighbour cells only and does not affect the serving cell. Since the re-evaluation triggers are based on the serving cell's measurements, this will allow to detect that a user equipment—currently applying relaxation—at some point starts moving, and in turn to stop/reduce the relaxation. As an example, a re-evaluation trigger is for instance the observation that the radio channel parameters reveal that the channel is not semi-stationary any longer. Depending on the level of non-stationarity observed in the channel, relaxation could be in principle stopped/reduced immediately even without waiting for a re-evaluation to complete.

The user equipment may or may not indicate to the network that the user equipment has performed measurement relaxation.

In the following, some example embodiments are shortly described.

According to a first example embodiment, the user equipment can reduce the number of beams (B) to be considered for a mobility-status evaluation, if the beam relaxation evaluation is positive.

According to a second example embodiment, if the beam relaxation evaluation is positive and the user equipment is determined to be in low-mobility (i.e. the user equipment fulfils the low-mobility condition), the user equipment can reduce the 'beam sweep' operation and visit certain beams less frequently when measuring the RRM measurements both on the serving cell and neighbour cells, where less frequently is e.g. few times the coherence time (which is the inverse of the Doppler spread). This way the user equipment would be extending the measurement relaxation allowance as per 38.304/38.133.

According to a third example embodiment, if the user equipment fulfils the low-mobility condition once and the channel is semi-stationary (based on the radio channel parameters), the user equipment can refrain from continuously re-evaluating the low-mobility condition by setting a longer re-evaluation interval, whose length can depend on the estimated channel parameter and on the outcome of the previous evaluation. The user equipment can also minimize the number of beams to be monitored in subsequent low-mobility re-evaluations.

The radio channel parameters to be used for this procedure could also be estimated for other purposes in the user equipment, for instance for paging monitoring.

According to a fourth example embodiment, if the radio channel parameters reveal that the channel is semi-stationary (e.g. having low Doppler spread and low delay spread), the user equipment can decrease the number of measurement samples (K) to collect within a mobility-status evaluation period. The lower number of measurement samples could be in both time and frequency domain due to the low Doppler spread and low delay spread.

An RF frontend comprises RF circuitry between a baseband processor and one or more antenna ports. The RF frontend comprises a transmission path/chain and a reception path/chain. Examples of circuitry of the RF frontend comprise one or more band-pass filters, power amplifiers, local oscillators, and mixers. The transmission path converts a baseband signal to RF signal for feeding the RF signal to antenna via an antenna port. The reception path converts an RF signal received by an antenna connected to an antenna port to a baseband signal that is fed to the baseband part. The conversion of the signal between the baseband processor and the antenna port may be via at least one intermediate frequency. The RF frequencies may be licensed or unlicensed frequencies. Examples in accordance with at least some embodiments may utilize at least RF frequencies below 6 GHz.

A baseband signal comprises an unmodulated signal or a modulated signal comprising one or more symbols according to a modulation method. The baseband signal may be an IQ signal comprising an in-phase and a quadrature phase. An example of the modulation method is a multi-carrier modulation method such as an orthogonal frequency-division multiplexing (OFDM) scheme. The OFDM symbols may form a transmission burst for a communications channel of a wireless communications system. Examples of the communications channels comprise at least shared and dedicated communications channels that may be uplink, UL, channels or downlink, DL, channels. An uplink channel refers to a channel for transmitting data from a wireless device to an access node and a downlink channel refers to a channel for transmitting data from an access node to a wireless device.

MIMO in wireless communications is a technique that enables the transmission and reception of multiple independent data streams. This helps to increase the maximum data rate at which communications can occur reliably. Some applications of MIMO are described in the following sections.

A MIMO transceiver, MIMO TRX, comprises at least an RF frontend and antenna ports for connecting to multiple antennas for transmission, TX, and reception, RX, of a MIMO transmission. The MIMO transceiver may be capable of single antenna transmissions, e.g. Single input Multiple output, single input single output. The RF frontend may be connected to a baseband processor. The RF frontend comprise a plurality of unique hardware (HW) paths through the RF front between the baseband processor and antenna ports. The HW paths comprise transmission paths and reception paths. Each of the HW paths introduce a delay that is characteristic for a specific transmission path. A base band signal for a MIMO transmission is processed by two or more transmission paths and fed to at least two antennas via antenna ports. Transmission times of the signal via each of the antennas should be time aligned for reducing a delay margin required of the MIMO transmission.

A baseband transceiver, TRX, may be a baseband processor that performs baseband processing of transmitted and received signals via an RF frontend. A typical interface between the baseband processor and the RF frontend comprises an analog-to-digital converter, ADC, and a digital-to-analog converter, DAC. The baseband processor processes baseband signals for transmission and reception by the RF frontend.

At least some of the embodiments may be applied in a wireless communication system or a wireless communication network that supports TSN. 5G standard is seen as one example that could fit to meet very stringent requirements in terms of both latency and reliability as well as highly precise synchronization accuracy of the applications running over TSN networks. Also other standards may be feasible.

In the following, different exemplifying embodiments will be described using, as an example of an access architecture to which the embodiments may be applied, a radio access architecture based on Long Term Evolution Advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet protocol multimedia subsystems (IMS) or any combination thereof.

FIG. 8 depicts examples of simplified system architectures only showing some elements and functional entities, all being logical units, whose implementation may differ from what is shown. The connections shown in FIG. 8 are logical connections; the actual physical connections may be different. It is apparent to a person skilled in the art that the system typically comprises also other functions and structures than those shown in FIG. 8.

The embodiments are not, however, restricted to the system given as an example but a person skilled in the art may apply the solution to other communication systems provided with necessary properties.

The example of FIG. 8 shows a part of an exemplifying radio access network.

FIG. 8 shows user equipments 110a and 110b configured to be in a wireless connection on one or more communication channels in a cell with an access node (such as (e/g)NodeB) 104 providing the cell. The physical link from a user equipment to a (e/g)NodeB is called uplink or reverse link and the physical link from the (e/g)NodeB to the user equipment is called downlink or forward link. It should be appreciated that (e/g)NodeBs or their functionalities may be implemented by using any node, host, server or access point etc. entity suitable for such a usage.

A communication system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user equipments. The antenna unit may comprise a plurality of antennas or antenna elements. The (e/g)NodeB is further connected to core network 109 (CN or next generation core NGC). Depending on the system, the counterpart on the CN side can be a serving gateway (S-GW, routing and forwarding user data packets), packet data network gateway (P-GW), for providing connectivity of user equipments (UEs) to external packet data networks, or mobile management entity (MME), etc. The CN may comprise network entities or nodes that may be referred to management entities. Examples of the network entities comprise at least an Access management Function (AMF).

The user equipment (also called a user device, a user terminal, a terminal device, a wireless device, a mobile station (MS) etc.) illustrates one type of an apparatus to which resources on the air interface are allocated and assigned, and thus any feature described herein with a user equipment may be implemented with a corresponding network apparatus, such as a relay node, an eNB, and an gNB. An example of such a relay node is a layer 3 relay (self-backhauling relay) towards the base station.

The user equipment typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user equipment may also be a nearly exclusive uplink only device, of which an example is a camera or video camera loading images or video clips to a network. A user equipment may also be a device having capability to operate in Internet of Things (IoT) network which is a scenario in which objects are provided with the ability to transfer data over a network without requiring human-to-human or human-to-computer interaction. The user equipment may also utilize cloud. In some applications, a user equipment may comprise a small portable device with radio parts (such as a watch, earphones or eyeglasses) and the computation is carried out in the cloud. The user equipment (or in some embodiments a layer 3 relay node) is configured to perform one or more of user equipment functionalities. The user equipment may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 8) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 102, or utilize services provided by them. The communication network may also be able to support the usage of cloud services, for example at least part of core network operations may be carried out as a cloud service (this is depicted in FIG. 8 by "cloud" 102). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well. The gNB is a next generation Node B (or, new Node B) supporting the 5G network (i.e., the NR).

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user equipment may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 8 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 8). A HNB Gateway (HNB-GW), which is typically installed within an operator's network may aggregate traffic from a large number of HNBs back to a core network.

Figure 9:
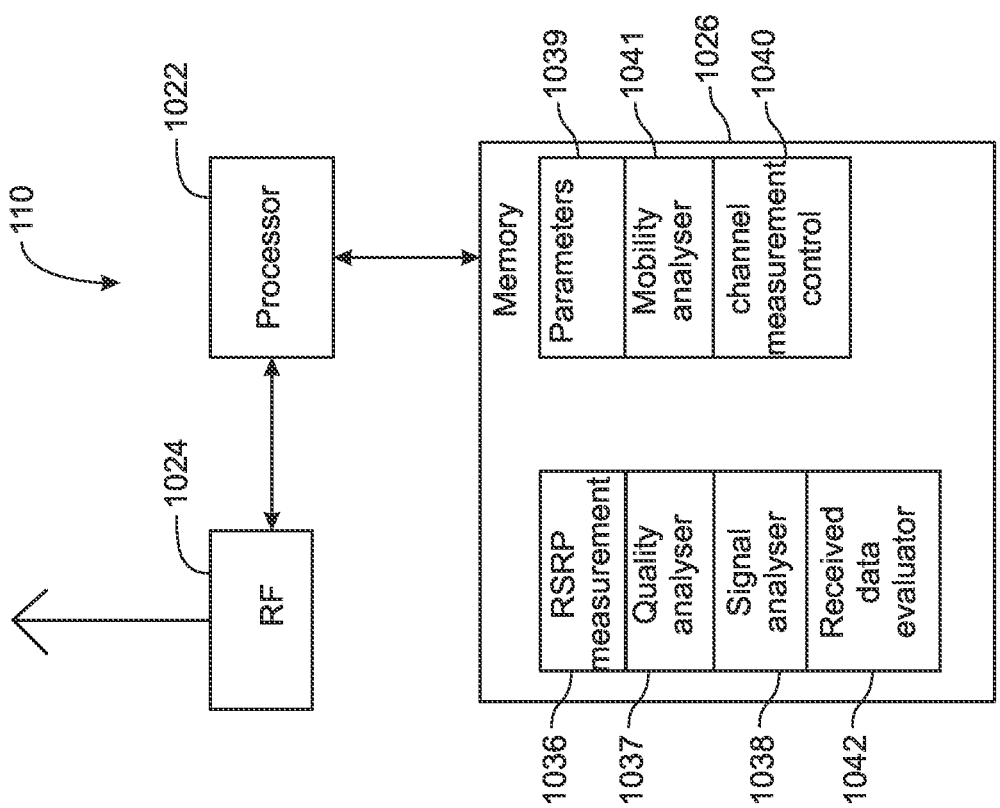
FIG. 9 shows a block diagram of an apparatus in accordance with at least some embodiments.

FIG. 9 illustrates an example of a block diagram of an apparatus 110 in accordance with at least some embodiments of the present invention. The apparatus 110 may be, for example, a part of the resource manager. The apparatus 110 comprises a processor 1022, a memory 1024 and a transceiver 1024. The processor is operatively connected to the transceiver for controlling the transceiver. The apparatus may comprise a memory 1026. The memory may be operatively connected to the processor. It should be appreciated that the memory may be a separate memory or included to the processor and/or the transceiver. The memory 1026 may be used to store information, for example, about thresholds, default values for B and K and/or for some other information.

FIG. 9 also illustrates the operational units as a computer code stored in the memory but they may also be implemented using hardware components or as a mixture of computer code and hardware components.

According to an embodiment, the processor is configured to control the transceiver and/or to perform one or more functionalities described with a method according to an embodiment.

A memory may be a computer readable medium that may be non-transitory. The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general-purpose computers, special purpose computers, microprocessors, digital signal processors (DSPs) and processors based on multi-core processor architecture, as non-limiting examples.

Embodiments may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialized circuits such as field programmable gate arrays FPGA, application specify circuits ASIC, signal processing devices and other devices. References to computer readable program code means, computer program, computer instructions, computer code etc. should be understood to express software for a programmable processor firmware such as the programmable content of a hardware device as instructions for a processor or configured or configuration settings for a fixed function device, gate array, programmable logic device, etc.

Although the above examples describe embodiments of the invention operating within a wireless device or a gNB, it would be appreciated that the invention as described above may be implemented as a part of any apparatus comprising a circuitry in which radio frequency signals are transmitted and/or received. Thus, for example, embodiments of the invention may be implemented in a mobile phone, in a base station, in a computer such as a desktop computer or a tablet computer comprising radio frequency communication means (e.g. wireless local area network, cellular radio, etc.).

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules, field-programmable gate arrays (FPGA), application specific integrated circuits (ASIC), microcontrollers, microprocessors, a combination of such modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term "circuitry" may refer to one or more or all of the following:
 (a) hardware-only circuit implementations (such as implementations in only analogue and/or digital circuitry) and
 (b) combinations of hardware circuits and software, such as (as applicable):

(i) a combination of analogue and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

EXAMPLES

The following is a list of examples in accordance with at least some embodiments:

Example 1. An apparatus comprising:
means for obtaining one or more mobility parameters;
means for obtaining one or more radio channel parameters regarding two or more wireless signal transmission beams of an access point of a wireless communication network;
means for measuring signals from a radio channel;
means for evaluating one or more measurement relaxation conditions related to the obtained one or more measurement parameters based on adjusted parameters for measuring signals; and
means for adjusting the means for measuring signals on the basis of the evaluation result.

Example 2. The apparatus according to Example 1 wherein said adjusted parameters for measuring signals comprises at least one of an adjusted number of measurement samples and an adjusted number of received beams.

Example 3. The apparatus according to Example 1 or 2 comprising:
means for obtaining one or more radio channel parameters regarding two or more wireless signal transmission beams of an access point of a wireless communication network.

Example 4. The apparatus according to any of the Examples 1 to 3 comprising one or both of the following:
means for evaluating at least one of a mobility status and a not-at-cell edge status of the apparatus;
means for evaluating whether the apparatus is not at a cell edge.

Example 5. The apparatus according to Example 4 configured to obtain at least one of the mobility status and a not-at-cell edge status by at least one of the following:
examining whether the apparatus is not moving or the movement is lower than a low-motion threshold;
examining whether the received signal power or the received signal quality changes less than a quasi-stationary threshold;
examining whether the received signal power or the received signal quality is above a threshold.

Example 6. The apparatus according to any of the Examples 1 to 5, said means for evaluating being configured to perform at least one of:
examine received signal power;
estimate one or more radio channel parameters based on one of received synchronization signal block reference signal and channel state information reference signal;
examine the mobility status of the apparatus;
examine the cell-edge status of the apparatus.

Example 7. The apparatus according to any of the Examples 1 to 6, said means for adjusting comprising means for performing at least one of the following:
changing a number of beams to be evaluated;
changing a number of samples to be taken from the signals for the evaluation;
adjusting a bandwidth to measure;
adjusting a measurement period;
changing a time between two successive measurements.

Example 8. The apparatus according to the Example 7, said means for adjusting comprising means for performing at least one of the following, if at least a measurement relaxation condition is met:
reducing the number of beams to be evaluated;
reducing the number of samples to be taken from the signals for the evaluation;
increasing the bandwidth to measure;
increasing the measurement period;
increasing the time between two successive measurements.

Example 9. The apparatus according to the Example 7 or 8, wherein said means for adjusting are configured to perform the adjustment only during an evaluation period.

Example 10. The apparatus according to any of the Examples 1 to 9, said means for obtaining one or more radio channel parameters being configured to obtain one or more of the following channel parameters:
a doppler spread;
a delay spread.

Example 11. The apparatus according to any of the Examples 1 to 10, said means for evaluating being configured to:
compare the obtained doppler spread or delay spread parameter with a threshold; and
determine that the apparatus is low mobility if the compared value is less than the threshold.

Example 12. A method comprising:
obtaining one or more measurement parameters;
measuring signals from a radio channel;
evaluating one or more measurement relaxation conditions related to the obtained one or more measurement parameters based on adjusted parameters for measuring signals; and
adjusting the measurement of the signals on the basis of the evaluation result.

Example 13. The method according to Example 12, wherein said adjusted parameters for measuring signals comprises at least one of an adjusted number of measurement samples and an adjusted number of received beams.

Example 14. The method according to Example 12 or 13 comprising:
obtaining one or more radio channel parameters regarding two or more wireless signal transmission beams of an access point of a wireless communication network.

Example 15. The method according to any of the Examples 12 to 14 comprising one or both of the following:
evaluating at least one of a mobility status of the apparatus and a not-at-cell edge status;

evaluating whether the apparatus is not at a cell edge.

Example 16. The method according to Example 15 comprising obtaining at least one of the mobility status and a not-at-cell edge status by at least one of the following:
examining whether the apparatus is not moving or the movement is lower than a low-motion threshold;
examining whether the received signal power or the received signal quality changes less than a quasi-stationary threshold;
examining whether the received signal power or the received signal quality is above a threshold.

Example 17. The method according to any of the Examples 12 to 16, said evaluating comprising at least one of:
examining received signal power;
estimating one or more radio channel parameters based on one of received synchronization signal block reference signal and channel state information reference signal;
examining the mobility status of the apparatus.

Example 18. The method according to any of the Examples 12 to 17 comprising performing at least one of the following, if the measurement relaxation condition is met:
changing a number of beams to be evaluated;
changing a number of samples to be taken from the signals for the evaluation;
adjusting a bandwidth to measure;
adjusting a measurement period;
changing a time between two successive measurements.

Example 19. The method according to the Example 18 comprising performing at least one of the following, if at least a measurement relaxation condition is met:
reducing a number of beams to be evaluated;
reducing a number of samples to be taken from the signals for the evaluation;
increasing the bandwidth to measure;
increasing the measurement period;
increasing the time between two successive measurements.

Example 20. The method according to the Example 18 or 19, wherein said means for adjusting are configured to perform the adjustment only during an evaluation period.

Example 21. The method according to any of the Examples 12 to 20 comprising obtaining one or more of the following channel parameters:
a doppler spread;
a delay spread.

Example 22. The method according to any of the Examples 12 to 21, said evaluating comprising:
compare the obtained doppler spread or delay spread parameter with a threshold; and
determine that the apparatus is low mobility if the compared value is less than the threshold.

Example 23. An apparatus comprising at least one processor; and at least one memory including computer program code the at least one memory and the computer program code configured to, with the at least one processor, cause the apparatus to perform at least the following:
obtain one or more measurement parameters;
measure signals from a radio channel;
evaluate one or more measurement relaxation conditions related to the obtained one or more measurement parameters based on adjusted parameters for measuring signals; and
adjust the measurement of the signals on the basis of the evaluation result.

Example 24. The apparatus according to Example 23, wherein said adjusted parameters for measuring signals comprises at least one of an adjusted number of measurement samples and an adjusted number of received beams.

Example 25. The apparatus according to Example 23 or 24, said least one memory including computer program code configured to, with the at least one processor, cause the apparatus to perform at least the following:
obtain one or more radio channel parameters regarding two or more wireless signal transmission beams of an access point of a wireless communication network.

Example 26. The apparatus according to any of the Examples 23 to 25, said least one memory including computer program code configured to, with the at least one processor, cause the apparatus to perform at least one or both of the following:
evaluate at least one of a mobility status of the apparatus and a not-at-cell edge status;
evaluate whether the apparatus is not at a cell edge.

Example 27. The apparatus according to Example 26, said least one memory including computer program code configured to, with the at least one processor, cause the apparatus to perform at least the following:
examine whether the apparatus is not moving or the movement is lower than a low-motion threshold;
examine whether the received signal power or the received signal quality changes less than a quasi-stationary threshold;
examining whether the received signal power or the received signal quality is above a threshold.

Example 28. The apparatus according to any of the Examples 23 to 27, said least one memory including computer program code configured to, with the at least one processor, cause the apparatus to perform at least the following:
examine received signal power;
estimate one or more radio channel parameters based on one of received synchronization signal block reference signal and channel state information reference signal;
examine the mobility status of the apparatus.

Example 29. The apparatus according to any of the Examples 23 to 28, said least one memory including computer program code configured to, with the at least one processor, cause the apparatus to perform the adjustment by at least the following:
change a number of beams to be evaluated;
change a number of samples to be taken from the signals for the evaluation;
adjust a bandwidth to measure;
adjust a measurement period;
change a time between two successive measurements.

Example 30. The apparatus according to the Example 29, said least one memory including computer program code configured to, with the at least one processor, cause the apparatus to perform the adjustment by at least the following:
reduce the number of beams to be evaluated;
reduce the number of samples to be taken from the signals for the evaluation;
adjust the bandwidth to measure;
adjust the measurement period;
increase the time between two successive measurements.

Example 31. The apparatus according to the Example 29 or 30, said least one memory including computer program code configured to, with the at least one processor, cause the apparatus to perform the adjustment only during an evaluation period.

Example 32. The apparatus according to any of the Examples 23 to 31, said least one memory including computer program code configured to, with the at least one processor, cause the apparatus to obtain one or more of the following channel parameters:
    a doppler spread;
    a delay spread.
Example 33. The apparatus according to any of the Examples 23 to 32, said least one memory including computer program code configured to, with the at least one processor, cause the apparatus to perform the evaluation by at least the following:
    compare the obtained doppler spread or delay spread parameter with a threshold; and
    determine that the apparatus is low mobility if the compared value is less than the threshold.
Example 34. An apparatus comprising:
    a first circuitry configured to obtain one or more measurement parameters;
    a second circuitry configured to measure signals from a radio channel;
    assign a set of subcarriers for candidate user equipment of the radio access technology for each spatial beam index; and
    a third circuitry configured to evaluate one or more measurement relaxation conditions related to the obtained one or more measurement parameters based on adjusted parameters for measuring signals; and
    a fourth circuitry configured to adjust the measurement of the signals on the basis of the evaluation result.
Example 35. The apparatus according to Example 34, wherein said adjusted parameters for measuring signals comprises at least one of an adjusted number of measurement samples and an adjusted number of received beams.
Example 36. A user equipment comprising:
    means for obtaining one or more measurement parameters;
    means for measuring signals from a radio channel;
    means for evaluating one or more measurement relaxation conditions related to the obtained one or more measurement parameters based on adjusted parameters for measuring signals; and
    means for adjusting the means for measuring signals on the basis of the evaluation result.
Example 37. The user equipment according to Example 36, wherein said adjusted parameters for measuring comprises at least one of an adjusted number of measurement samples and an adjusted number of received beams.
Example 38. A computer program product comprising computer readable program code which, when executed by at least one processor; cause the apparatus to perform at least the following:
    obtain one or more measurement parameters;
    measure signals from a radio channel;
    evaluate one or more measurement relaxation conditions related to the obtained one or more measurement parameters based on adjusted parameters for measuring signals; and
    adjust the measurement of the signals on the basis of the evaluation result.
Example 39. The computer program product according to Example 38, wherein said adjusted parameters for measuring signals comprises at least one of an adjusted number of measurement samples and an adjusted number of received beams.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. An apparatus comprising:
    at least one processor; and
    at least one memory including computer program code;
    the at least one memory and the computer program code configured to, with the at least one processor, cause the apparatus at least to:
    obtain one or more measurement parameters;
    measure signals from a radio channel;
    evaluate one or more measurement relaxation conditions related to the obtained one or more measurement parameters based on the measured signals from the radio channel; and
    adjust a number of received beams on the basis of the evaluation result.

2. The apparatus according to claim 1, wherein the at least one processor and the computer program code configured to cause the apparatus to:
    obtain one or more radio channel parameters regarding two or more wireless signal transmission beams of an access point of a wireless communication network.

3. The apparatus according to claim 1, wherein the at least one processor and the computer program code configured to cause the apparatus to perform at least one of the following:
    evaluate at least one of a mobility status and a not-at-cell edge status of the apparatus; or
    evaluate whether the apparatus is not at a cell edge.

4. The apparatus according to claim 3, wherein the at least one processor and the computer program code configured to cause the apparatus to obtain at least one of the mobility status and a not-at-cell edge status by at least one of the following:
    examine whether the apparatus is not moving or the movement is lower than a low-motion threshold;
    examine whether the received signal power or the received signal quality changes less than a quasi-stationary threshold; and/or
    examine whether the received signal power or the received signal quality is above a threshold.

5. The apparatus according to claim 1, wherein the at least one processor and the computer program code configured to cause the apparatus to evaluate comprises the at least one processor and the computer program code configured to cause the apparatus to perform at least one of:
    examine received signal power;
    estimate one or more radio channel parameters based on one of received synchronization signal block reference signal and channel state information reference signal;
    examine the mobility status of the apparatus; and/or
    examine the cell-edge status of the apparatus.

6. The apparatus according to the claim 5, wherein the at least one processor and the computer program code configured to cause the apparatus to adjust comprises the at least one processor and the computer program code configured to cause the apparatus to adjust the measurement of the signals on the basis of the evaluation result only during an evaluation period.

7. The apparatus according to claim 1, wherein the at least one processor and the computer program code configured to cause the apparatus to adjust comprises the at least one processor and the computer program code configured to cause the apparatus to perform at least one of the following, if the measurement relaxation condition is met:
reduce a number of beams to be evaluated;
reduce a number of samples to be taken from the signals for the evaluation;
adjust a bandwidth to measure;
adjust a measurement period; and/or
increase a time between two successive measurements.

8. The method according to claim 7, wherein the evaluating comprising at least one of:
examining received signal power;
estimating one or more radio channel parameters based on one of received synchronization signal block reference signal and channel state information reference signal;
examining the mobility status of the apparatus; or
examine the cell-edge status of the apparatus.

9. The method according to claim 8, wherein the adjusting comprises adjusting only during an evaluation period.

10. The apparatus according to claim 1, wherein the at least one processor and the computer program code configured to cause the apparatus to obtain one or more radio channel parameters comprises the at least one processor and the computer program code configured to cause the apparatus to obtain one or more of the following channel parameters:
a doppler spread;
a delay spread.

11. The apparatus according to claim 10, wherein the at least one processor and the computer program code configured to cause the apparatus to evaluate comprises the at least one processor and the computer program code configured to cause the apparatus to:
compare the obtained doppler spread or delay spread parameter with a threshold; and
determine that the apparatus is low mobility if the compared value is less than the threshold.

12. The apparatus according to claim 1, wherein the at least one processor and the computer program code configured to cause the apparatus to adjust comprises the at least one processor and the computer program code configured to cause the apparatus to reduce a number of beams to be evaluated based on the measurement relaxation condition being met.

13. The apparatus according to claim 1, wherein the at least one processor and the computer program code are configured to cause the apparatus to:
adjust a bandwidth to measure on the basis of the evaluation result.

14. The apparatus according to claim 1, wherein the at least one processor and the computer program code are configured to cause the apparatus to:
increase a bandwidth to measure on the basis of the evaluation result.

15. A method comprising:
obtaining one or more measurement parameters;
measuring signals from a radio channel;
evaluating one or more measurement relaxation conditions related to the obtained one or more measurement parameters based on the measured signals from the radio channel; and
adjusting a number of received beams on the basis of the evaluation result.

16. The method according to claim 15, comprising:
obtaining one or more radio channel parameters regarding two or more wireless signal transmission beams of an access point of a wireless communication network.

17. The method according to claim 15, comprising one or more of the following:
evaluating at least one of a mobility status and a not-at-cell edge status of the apparatus; or
evaluating whether the apparatus is not at a cell edge.

18. The method according to claim 17 comprising obtaining at least one of the mobility status and a not-at-cell edge status by at least one of the following:
examining whether the apparatus is not moving or the movement is lower than a low-motion threshold;
examining whether the received signal power or the received signal quality changes less than a quasi-stationary threshold; and/or
examining whether the received signal power or the received signal quality is above a threshold.

19. The method according to claim 15, comprising performing at least one of the following, if the measurement relaxation condition is met:
reducing a number of beams to be evaluated;
reducing a number of samples to be taken from the signals for the evaluation;
adjusting a bandwidth to measure;
adjusting a measurement period;
increasing a time between two successive measurements.

20. An apparatus comprising:
at least one processor; and
at least one memory including computer program code;
the at least one memory and the computer program code configured to, with the at least one processor, cause the apparatus at least to:
obtain a doppler spread or a delay spread for a channel;
compare the obtained doppler spread or delay spread to a threshold;
determine whether the obtained doppler spread or delay spread is less than the threshold;
determine whether the apparatus is low mobility based on the determining whether the obtained doppler spread or delay spread is less than the threshold;
evaluate whether the apparatus is not-at-cell edge; and
determine a relaxation level based on whether the apparatus is low mobility or not-at-cell-edge, or both; and
adjust a measurement of signals based on the determined relaxation level.

21. The apparatus of claim 20, wherein the at least one processor and the computer program code configured to cause the apparatus to adjust comprises the at least one processor and the computer program code configured to cause the apparatus to perform at least one of the following:
reduce a number of beams to be evaluated;
reduce a number of samples to be taken from the signals for the evaluation;
adjust a bandwidth to measure;
adjust a measurement period; and/or
increase a time between two successive measurements.

22. The apparatus of claim 20, wherein the at least one processor and the computer program code configured to cause the apparatus to adjust comprises the at least one processor and the computer program code configured to cause the apparatus to perform the following:
reduce a number of signal measurements and/or number of beams to be measured if the apparatus is either low mobility or not-at-cell-edge; and
further reduce the number of signal measurements and/or number of beams to be measured if the apparatus is both low mobility and not-at-cell-edge.

* * * * *